US012488235B2

(12) United States Patent
Wekel et al.

(10) Patent No.: US 12,488,235 B2
(45) Date of Patent: Dec. 2, 2025

(54) GROUND TRUTH DATA GENERATION FOR DEEP NEURAL NETWORK PERCEPTION IN AUTONOMOUS DRIVING APPLICATIONS

(71) Applicant: NVIDIA Corporation, Santa Clara, CA (US)

(72) Inventors: Tilman Wekel, Sunnyvale, CA (US); Joachim Pehserl, Lynnwood, WA (US); Jacob Meyer, Honolulu, HI (US); Jake Guza, Lexington, MA (US); Anton Mitrokhin, Santa Clara, CA (US); Richard Whitcomb, Lynnfield, MA (US); Marco Scoffier, Lincroft, NJ (US); David Nister, Bellevue, WA (US); Grant Monroe, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 1013 days.

(21) Appl. No.: 17/187,350

(22) Filed: Feb. 26, 2021

(65) Prior Publication Data
US 2022/0277193 A1   Sep. 1, 2022

(51) Int. Cl.
*G06N 3/08* (2023.01)
*G06T 19/00* (2011.01)
*G06V 20/56* (2022.01)

(52) U.S. Cl.
CPC .............. *G06N 3/08* (2013.01); *G06T 19/00* (2013.01); *G06V 20/56* (2022.01); *G06T 2219/004* (2013.01)

(58) Field of Classification Search
None
See application file for complete search history.

(56) References Cited

U.S. PATENT DOCUMENTS 10,282,852 B1 * 5/2019 Buibas ................... G06T 7/246
10,871,783 B2   12/2020 Julian et al.
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
(Continued)

*Primary Examiner* — James A Thompson
*Assistant Examiner* — Kim Thanh T Tran
(74) *Attorney, Agent, or Firm* — Freestone Intellectual Property Law PLLC

(57) ABSTRACT

An annotation pipeline may be used to produce 2D and/or 3D ground truth data for deep neural networks, such as autonomous or semi-autonomous vehicle perception networks. Initially, sensor data may be captured with different types of sensors and synchronized to align frames of sensor data that represent a similar world state. The aligned frames may be sampled and packaged into a sequence of annotation scenes to be annotated. An annotation project may be decomposed into modular tasks and encoded into a labeling tool, which assigns tasks to labelers and arranges the order of inputs using a wizard that steps through the tasks. During the tasks, each type of sensor data in an annotation scene may be simultaneously presented, and information may be projected across sensor modalities to provide useful contextual information. After all annotation tasks have been completed, the resulting ground truth data may be exported in any suitable format.

20 Claims, 19 Drawing Sheets

(56) References Cited

U.S. PATENT DOCUMENTS

| | | | |
|---|---|---|---|
| 10,885,698 | B2 | 1/2021 | Muthler et al. |
| 11,393,097 | B2 | 7/2022 | Brunner et al. |
| 11,548,533 | B2 | 1/2023 | Liang et al. |
| 11,688,181 | B2 | 6/2023 | Park et al. |
| 2018/0329066 | A1* | 11/2018 | Pacala ................ G01S 17/42 |
| 2019/0049958 | A1 | 2/2019 | Liu et al. |
| 2019/0258251 | A1* | 8/2019 | Ditty ................ G05D 1/0274 |
| 2019/0325580 | A1 | 10/2019 | Lukac et al. |
| 2019/0346842 | A1* | 11/2019 | Bye .................... G06V 20/17 |
| 2019/0384291 | A1* | 12/2019 | Michalakis ........ G06N 3/006 |
| 2020/0019160 | A1* | 1/2020 | McArthur .......... G01S 7/52004 |
| 2020/0019799 | A1* | 1/2020 | Shen .................. G06V 10/25 |
| 2020/0089969 | A1* | 3/2020 | Lakshmi Narayanan ................ G06V 20/49 |
| 2020/0184718 | A1 | 6/2020 | Chiu et al. |
| 2020/0210706 | A1 | 7/2020 | Barzelay et al. |
| 2020/0219264 | A1* | 7/2020 | Brunner ............. G01S 7/4808 |
| 2020/0265247 | A1 | 8/2020 | Musk et al. |
| 2020/0410259 | A1 | 12/2020 | Srinivasan |
| 2021/0042530 | A1 | 2/2021 | Kim et al. |
| 2021/0241026 | A1 | 8/2021 | Deng et al. |
| 2021/0264224 | A1 | 8/2021 | Tamaoki |
| 2021/0334556 | A1 | 10/2021 | Vignard et al. |
| 2022/0012518 | A1* | 1/2022 | Sutherland ......... G06F 18/2148 |
| 2022/0019735 | A1* | 1/2022 | Shekhar ............. G06F 16/9538 |
| 2022/0277515 | A1* | 9/2022 | Chandler ................ G06T 7/10 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

"Programmable Vision Accelerator", U.S. Appl. No. 15/141,703, filed Apr. 28, 2016.

"Reliability Enhancement Systems and Methods" U.S. Appl. No. 15/338,247, filed Oct. 28, 2016.

"Methodology of Using a Single Controller (ECU) For a Fault-Tolerant/Fail-Operational Self-Driving System", U.S. Appl. No. 62/524,283, filed Jun. 23, 2017.

"Systems and Methods for Safe and Reliable Autonomous Vehicles" U.S. Appl. No. 62/584,549, filed Nov. 10, 2017.

"System and Method for Controlling Autonomous Vehicles", U.S. Appl. No. 62/614,466, filed Jan. 7, 2018.

"System and Method for Safe Operation of Autonomous Vehicles", U.S. Appl. No. 62/625,351, filed Feb. 2, 2018.

"Conservative Control for Zone Driving of Autonomous Vehicles Using Safe Time of Arrival", U.S. Appl. No. 62/628,831, filed Feb. 9, 2018.

"System and Method for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for autonomous vehicles" U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Convolutional Neural Networks to Detect Drivable Freespace for Autonomous Vehicles" U.S. Appl. No. 62/643,665, filed Mar. 15, 2018.

"Deep Neural Network for Estimating Depth from Stereo Using Semi-Supervised Learning", U.S. Appl. No. 62/646,148, filed Mar. 21, 2018.

"System and Methods for Advanced AI-Assisted Vehicles", U.S. Appl. No. 62/648,358, filed Mar. 26, 2018.

"System and Method for Training, Testing, Verifying, and Validating Autonomous and Semi-Autonomous Vehicles", U.S. Appl. No. 62/648,399, filed Mar. 27, 2018.

"Method and System of Remote Operation of a Vehicle Using an Immersive Virtual Reality Environment", U.S. Appl. No. 62/648,493, filed Mar. 27, 2018.

"System and Methods for Virtualized Intrusion Detection and Prevent System in Autonomous Vehicles", U.S. Appl. No. 62/682,803, filed Jun. 8, 2018.

"Deep Learning for Path Detection in Autonomous Vehicles", U.S. Appl. No. 62/684,328, filed Jun. 13, 2018.

"Methods for High-Precision, High-Accuracy Lane Detection in Autonomous Driving Applications", U.S. Appl. No. 62/699,669, filed Jul. 17, 2018.

International Preliminary Report on Patentability received for PCT Patent Application No. PCT/US2021/038262, mailed on Jan. 5, 2023, 9 pages.

Park, et al.; Notice of Allowance for U.S. Appl. No. 17/353,231, filed Jun. 21, 2021, mailed Mar. 6, 2023, 26 pgs.

Final Office Action, U.S. Appl. No. 18/309,878, Notification Date: Sep. 6, 2024, 14 pages.

Non-Final Office Action, U.S. Appl. No. 18/309,878, Notification Date: Aug. 15, 2024, 14 pages.

Non-Final Office Action, U.S. Appl. No. 18/309,878, Notification Date: Nov. 7, 2024, 15 pages.

Caltagirone, L., et al., "LIDAR-Camera Fusion for Road Detection Using Fully Convolutional Neural Networks", arxiv.org, Cornell University Library, pp. 1-7 (Sep. 21, 2018).

Oh, S., and Kang, H., "Object Detection and Classification by Decision-Level Fusion for Intelligent Vehicle Systems", Department of Media Engineering, Catholic University of Korea, pp. 1-21 (Jan. 22, 2017).

International Search Report and Written Opinion received for PCT Patent Application No. PCT/US2021/038262, mailed on Sep. 13, 2019, 14 pages.

Notice of Allowance, U.S. Appl. No. 18/309,878, Notification Date: Feb. 12, 2025, 9 pages.

Office Action, CN Application No. 2022101733714, Notification Date: May 30, 2025, 14 pages.

* cited by examiner

| Sensors / Scene Index: ~310 | LiDAR:vls128 ~320 | camera:rear:center:60fov ~330 | camera:front:center:8mp:120fov:rggb ~340 | camera:rear:left:120fov ~350 | camera:rear:right:120fov ~360 |
|---|---|---|---|---|---|
| 0 | 0 |  |  |  |  |
| 1 | 10 | 109 | 169 | 85 | 27 |
| 2 | 20 | 139 | 199 | 115 | 57 |
| 3 | 30 | 169 | 229 | 145 | 87 |
| 4 | 40 | 199 | 259 | 175 | 117 |
| 5 | 50 | 229 | 289 | 205 | 147 |
| 6 | 60 | 259 | 319 | 235 | 177 |
| 7 | 70 | 289 | 349 | 265 | 207 |
| 8 | 80 | 319 | 379 | 295 | 237 |
| 9 | 90 | 349 | 409 | 325 | 267 |
| 10 | 100 | 379 | 439 | 355 | 297 |
| 11 | 110 | 409 | 469 | 385 | 327 |
| 12 | 120 | 439 | 499 | 415 | 357 |
| 13 | 130 | 469 | 529 | 445 | 387 |
| 14 | 140 | 499 | 559 | 475 | 417 |
| 15 | 150 | 529 | 589 | 505 | 447 |
| 16 | 160 | 559 | 619 | 535 | 477 |
| 17 | 170 | 589 | 649 | 565 | 507 |
| 18 | 180 | 619 | 679 | 595 | 537 |
| 19 | 190 | 649 | 709 | 625 | 567 |
| 20 | 200 | 679 | 739 | 655 | 597 |
| 21 | 210 | 709 | 769 | 685 | 627 |
| 22 | 220 | 739 | 798 | 715 | 657 |
| 23 | 230 | 769 | 824 | 745 | 687 |
| 24 | 240 | 799 | 851 | 775 | 717 |
| 25 | 250 | 829 | 879 | 805 | 747 |
| 26 | 260 | 859 | 905 | 835 | 777 |
| 27 | 270 | 889 | 932 | 865 | 807 |
| 28 | 280 | 919 | 961 | 895 | 837 |
| 29 | 290 | 949 | 989 | 925 | 867 |
| 30 | 300 | 979 | 1013 | 955 | 897 |
| 31 | 310 | 1009 | 1037 | 985 | 927 |
|  |  | 1039 | 1063 | 1015 | 957 |

GROUND TRUTH DATA GENERATION FOR DEEP NEURAL NETWORK PERCEPTION IN AUTONOMOUS DRIVING APPLICATIONS

BACKGROUND

Designing a system to drive a vehicle autonomously and safely without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along the path of the vehicle. Thus, the ability to detect instances of animate objects (e.g., cars, pedestrians, etc.) and other parts of an environment is often critical for autonomous driving perception systems. Conventional perception methods often rely on cameras or LiDAR sensors to detect objects in an environment, and a variety of approaches have been developed using Deep Neural Networks (DNNs) to perform LiDAR and camera perception. Classes of such DNNs include DNNs that perform panoptic segmentation of camera images in perspective view, and DNNs that perform top-down or "Bird's Eye View" (BEV) object detection from LiDAR point clouds.

In order to train a DNN to perform perception with a suitable degree of accuracy, the DNN needs to be trained with accurate ground truth data. Real-time DNN perception is usually performed in two-dimensions (2D) due to computational constraints, so ground truth for these networks is usually given in 2D. However, as technology advances, three-dimensional (3D) perception is starting to become practical, and there is an unmet need for high quality 3D ground truth data.

Conventional techniques for generating ground truth for DNN perception in autonomous driving applications have a variety of drawbacks. Take the example described above where a first DNN performs panoptic segmentation of camera images in perspective view, and a second DNN performs perform object detection from top-down projections of LiDAR point clouds. In this case, the first DNN will need camera images with ground truth annotations, and the second DNN will need top down LiDAR projections with ground truth annotations. Conventionally, these types of ground truth annotations are generated in separate labeling processes. However, in certain circumstances, it is difficult or even impossible to generate accurate labels. Taking LiDAR and RADAR labeling as an example, these modalities generate sparse data and sometimes lack the granularity and context needed to apply an accurate label. In top-down views, it can be challenging or even impossible to distinguish pedestrians or bicycles, since top-down views of these objects often appear similar to top-down views of other objects like poles, tree trunks, or bushes. As a result, conventional labeling techniques can result in ground truth data with errors. Ideally, these errors are caught during a quality check, but still negatively impact throughput and efficiency, as well as wasting computational resources.

SUMMARY

Embodiments of the present disclosure relate to an annotation pipeline that produces 2D and/or 3D ground truth data for deep neural networks (DNNs), such as those that perform perception in autonomous or semi-autonomous vehicles, robots, or other object types.

Generally, the annotation pipeline described herein is an improved workflow and software interface that streamline the production of high quality ground truth data. Initially, sensor data may be captured with different types of sensors (sensor modalities) during a capture session. The data from the different sensors may be synchronized to align frames of sensor data that represent a similar world state. In an example involving LiDAR and cameras, as a LiDAR spin progresses and views different portions of the environment, the temporally closest camera frame for any given LiDAR spin may be selected based on the viewing angle of the camera relative to the LiDAR spin start angle and how long it takes for the LiDAR spin to align with the camera's field of view. In some embodiments, per-camera time or index offsets relative to LiDAR spin start may be determined and/or applied to align camera frames for each camera with LiDAR frames. Generally, frames of different types of sensor data may be aligned, sampled, and packaged into a sequence of annotation scenes to be annotated.

In some embodiments, an annotation project may be decomposed into modular tasks, which may be assigned to different labelers. In a non-limiting example involving cameras and LiDAR, initially some or all camera images in a sequence may be annotated, then some or all LiDAR frames in the sequence may be annotated (e.g., first top down 2D bounding boxes, then 3D bounding boxes), objects appearing in consecutive annotation scenes may be linked, and then objects appearing in both sensor modalities (LiDAR and camera frames) may be linked together. The annotation tasks may be encoded into a labeling tool, which assigns tasks to labelers and arranges the order of inputs using a wizard that guides labelers through the tasks. During the annotation tasks, each type of sensor data in an annotation scene may be presented to the labeler (e.g., side-by-side), and/or information may be projected across sensor modalities to provide useful contextual information such as correspondences among the different types of sensor data. In some embodiments, the labeling tool may progress the labeler through a per-object annotation procedure for each annotation scene in a sequence.

After some or all the annotation tasks in an annotation project have been completed, the resulting ground truth data may be exported in any suitable format. As such, one or more machine learning model(s) may be trained using the exported ground truth data.

BRIEF DESCRIPTION OF THE DRAWINGS

The present systems and methods for generating ground truth data for deep neural network perception are described in detail below with reference to the attached drawing figures, wherein:

FIG. 3 is a table illustrating an example alignment of sensor data indices, in accordance with some embodiments of the present disclosure;

DETAILED DESCRIPTION

Figure 1:
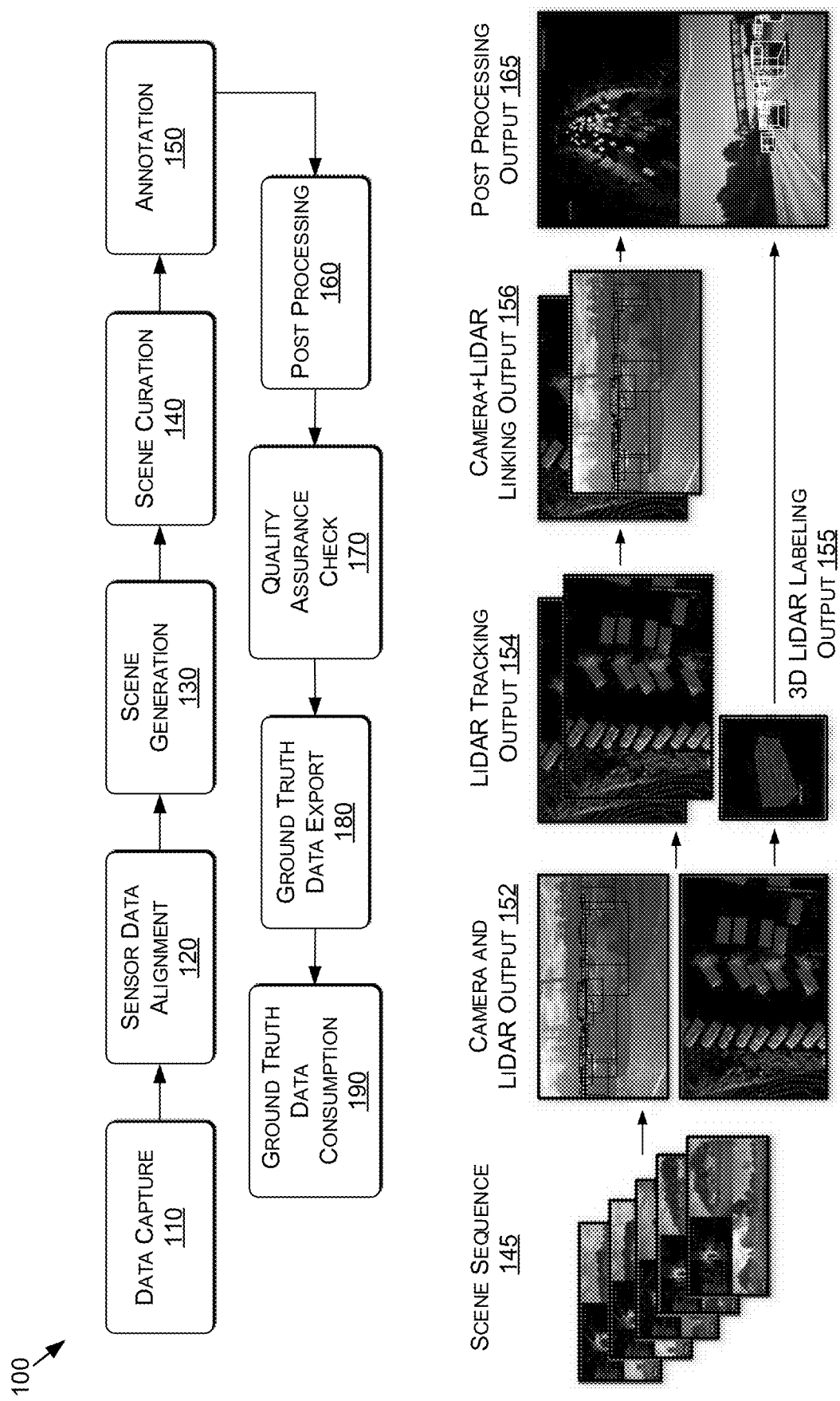
FIG. 1 is a data flow diagram illustrating an example annotation pipeline, in accordance with some embodiments of the present disclosure.

One potential solution to the problems described above is to project information across sensor modalities, which can assist the labeler by providing useful contextual information. However, this possibility raises a number of challenges. Conventionally, ground truth LiDAR annotations were limited to top down 2D bounding boxes, but top down bounding boxes do not project well into camera space and may not provide enough additional context to help labelers. Furthermore, it is difficult if not impossible to get perfect temporal alignment between different sensor modalities. Even assuming a configuration with multiple sensors (e.g., cameras and a LiDAR sensor), in an ideal scenario, a trigger is applied at a particular point in time, and all the sensors fire at the same time. In reality, this ideal scenario is almost never possible because of challenges synchronizing the cameras, synchronizing different types of sensors, differences in delay lines, differences in sampling frequencies (e.g., cameras running at 30 fps vs. LiDAR running at 10 fps), and the like. Taking LiDAR and cameras as a specific example, a LiDAR sensor takes time to spin (e.g., 100 milliseconds per revolution), so perfectly synchronizing a particular camera with respect to the location of a LiDAR spin is challenging and often practically impossible. There may also be practical limits to the spatial alignment among sensors, as individual calibration of each sensor often cannot recover all the degrees of freedom needed for a perfect alignment. As a result, projecting information across sensor modalities may mix information from different world states, potentially negating the benefit.

To address these and other challenges, systems and methods are disclosed relating to an annotation pipeline that produces 2D and/or 3D ground truth data for deep neural networks (DNNs), such as those that perform perception in autonomous or semi-autonomous vehicles, robots, or other object types. Although the present disclosure may be described with respect to an example autonomous vehicle 1400 (alternatively referred to herein as "vehicle 1400" or "ego-vehicle 1400," an example of which is described herein with respect to FIGS. 14A-14D), this is not intended to be limiting. For example, the systems and methods described herein may be used to generate ground truth training data for DNNs in non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used to generate training data for DNNs in robotics (e.g., path planning for a robot), aerial systems (e.g., path planning for a drone or other aerial vehicle), boating systems (e.g., path planning for a boat or other water vessel), and/or other technology areas, such as for localization, path planning, and/or other processes.

Generally, the annotation pipeline described herein is an improved workflow and software interface that streamline the production of higher quality ground truth data than prior techniques. Initially, sensor data is captured with different types of sensors (sensor modalities) during a capture session. In order to identify useful contextual information that can assist with annotation tasks, data from the different sensor modalities is synchronized to compose a sequence of annotation scenes (e.g., sets of sensor data taken at approximately the time). A desired segment of the sequence may be selected and designated for labeling, and the desired annotations may be decomposed into a set of linear tasks. The different tasks may be split up based on sensor type, type of object being labeled, level of annotation detail, and/or otherwise. The tasks may be entered or otherwise encoded into a labeling tool, which assigns tasks to labelers and arranges the order of inputs using a wizard that guides labelers through the tasks. During the annotation tasks, each type of sensor data in an annotation scene may be presented to the labeler (e.g., side-by-side), and/or information may be projected across sensor modalities to provide useful contextual information, such as correspondences among the different types of sensor data. In some cases, some types of annotations may be generated automatically. When some or all the annotation tasks are complete, the labeling tool may export the resulting ground truth annotations in any suitable format.

In some embodiments, an annotation project may be decomposed into modular tasks, which may be assigned to different labelers. In a non-limiting example involving cameras and LiDAR, initially some or all camera images in a sequence are labeled, then some or all LiDAR frames in the sequence are labeled (e.g., first top down 2D bounding boxes, then 3D bounding boxes), objects appearing in consecutive annotation scenes may be linked, and then objects appearing in both sensor modalities are linked together. Additionally or alternatively, an annotation project may be split up into multiple stages or tasks based on type of label (e.g., in a given task, only label cars, traffic signs, or some other element in a road scene), the level of detail (e.g., in a given task, only apply polylines for an object footprint or apply a full 3D bounding box), and/or in other ways. By decomposing an annotation project and prompting labelers to perform discrete project-specific tasks, the annotation pipeline may be modularized so labelers may focus on a discrete task at a time.

During any given annotation task, an interface of the labeling tool may present the different types of sensor data in an annotation scene (e.g., side-by-side) and/or project information across sensor modalities to provide useful contextual information. Projected information may include sensor detections (e.g., points, planes, scanlines), annotations, an input probe specifying a particular location within a frame of sensor data, and/or other information. By presenting contextual information during the annotation tasks, labelers are able to apply more accurate labels. For example, a group of pedestrians may be represented in a particular frame of LiDAR data with only a few point detections, but by presenting a corresponding camera frame, the labelers can easily see the pedestrians hidden in the LiDAR data. Similarly, if a labeler is unsure of what type of obstacle is represented by a particular LiDAR detection, in some embodiments, the labeler may click on the LiDAR detection and a visualization may be applied at a corresponding point in the camera frame (e.g., identifying a pick-up truck). The labeler may then be able to apply the proper label on the LiDAR frame.

The labeling tool and annotation pipeline described herein may provide a variety of benefits over prior techniques. Generally, providing additional context to a human labeler who is looking at sensor data improves the accuracy and efficiency of manual labeling and enables some types of ground truth labels that were not previously possible. For example, by presenting LiDAR data with additional context such as a (stitched) camera image, labelers may now accurately generate 3D LiDAR labels, such as 3D bounding boxes. With 3D bounding boxes annotated in LiDAR space, those labels may be projected into a corresponding camera image to provide useful context for camera labeling, which may enable labelers to generate more accurate camera labels. As a result, the techniques described herein provide for the specification of a more accurate representation of ground truth, which may be used to train more accurate DNNs.

Furthermore, presenting a labeler with additional context during labeling generally makes it easier for the labeler to produce labels. For example, presenting side-by-side views of different types of sensor data and/or illustrating correspondences across sensor modalities makes it easier for the labeler to comprehend the data, reducing cognitive load and speeding up cognition. As a result, the labeling tool described herein makes the labelers interactions with a computer more efficient in comparison with prior techniques. This improvement helps the overall workflow in terms of efficiency and throughput, and as a result, reduces demands on computing resources over prior techniques. In other words, the better the tools are, the more efficient the labeling and the higher the throughput. By making tools more user-friendly, various aspects of the present techniques speed up the annotation workflow by reducing the amount of rework over prior techniques.

Moreover, splitting up the annotation tasks and decomposing an annotation project into easily digestible tasks streamlines the annotation process and reduces the incidence of information overload. Many companies conventionally instruct labelers to perform all annotation tasks that are applicable to each frame of sensor data at once, which results in a complex labeling process that requires substantial training. By decomposing the needed annotations into smaller, digestible tasks, the tasks can be assigned to many labelers, making the labeling pipeline more scalable. Furthermore, by splitting up the annotation tasks by sensor type, the labeling process is not as sensitive to temporal or spatial misalignment between sensor modalities. For example, even if a LiDAR frame and a corresponding camera frame are not perfectly aligned, the impact on label accuracy is minimal because a LiDAR annotation task is performed directly in the LiDAR frame. In this example, the corresponding camera frame is only used as soft guidance, so any misalignment is not hard-coded as ground truth. Finally, in embodiments that include a linking task where a labeler associates previously made annotations across different sensor modalities and/or annotation scenes, by placing this task after the others, the linking task may serve as a quality check because the labeler is in a good position to review the annotations from both sensor modalities and/or annotation scenes. As a result, using this linking task eliminates the need to perform a separate quality check, further improving the overall workflow.

As such, the labeling tool and annotation pipeline described herein may be used to generate a more accurate representation of ground truth, which may be used to train more accurate DNNs.

Example Ground Truth Annotation Pipeline

Deep Neural Networks (DNNs) have been employed for a variety of tasks such as object detection and classification. In order to obtain training data for DNNs such as these, an annotation pipeline may be used to generate ground truth data. Generally, the ground truth data produced by an annotation pipeline may be customized based on the type of DNN to be trained. For DNNs that perform perception, an annotation pipeline may be customized to produce 2D and/or 3D ground truth data, such as labeled camera images (e.g., in perspective view), LiDAR or RADAR data (e.g., in top-down view), and/or other sensor data. Although certain embodiments are described with respect to DNNs that perform perception, the techniques described herein may be adapted to produce ground truth data for other types of DNNs.

With reference to FIG. 1, FIG. 1 is a data flow diagram illustrating an example annotation pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, annotation pipeline 100 may include a workflow and software interface that streamline the production of high quality ground truth data. In the example illustrated in FIG. 1, annotation pipeline 100 includes data capture 110, sensor data alignment 120, scene generation 130, scene curation 140, annotation 150, post-processing 160, quality assurance check 170, ground truth data export 180, and ground truth data consumption 190. For example, data capture 110 of real-world data may be performed to collect sensor data from different types of sensors (sensor modalities), and sensor data alignment 120 of the different types of sensor data may be performed to synchronize the sensor data so that sensor data of similar world states (e.g., sensor data captured at substantially the same time) may be grouped together and presented during annotation tasks. Scene generation 130 may be employed to compose a sequence of annotation scenes (e.g., sets of sensor data taken at approximately the time, such as scene sequence 145). For example, sensor data alignment 120 may involve adding offsets to capture times or some other index for the sensor data, and scene generation 130 may involve sampling sensor data and/or generating projection images for each annotation scene in a sequence. Scene curation 140 may be performed to select one or more segments of the annotation scenes (e.g., a segment of a data capture session without rain) and designate the segment(s) for annotation.

At a high level, a software tool (also called a labeling tool) such as a web tool may be used to facilitate annotation 150. Generally, a particular annotation project may be decomposed and/or arranged into a set of linear tasks forming a labeling recipe, which may split up the project and specify different tasks based on sensor type, type of objects being labeled, level of annotation detail, and/or otherwise. The tasks may be entered or otherwise encoded into the labeling tool, which may assign tasks to labelers and arrange the order of inputs using a wizard that guides labelers through the annotation tasks. In an example annotation project for LiDAR and camera ground truth data, initially some or all camera images in a sequence are labeled, then some or all LiDAR frames in the sequence are labeled (e.g., camera and LiDAR output 152), then objects that appear in multiple LiDAR frames are associated with one another (e.g., LiDAR tracking output 154), then objects appearing in multiple sensor modalities are linked together (e.g., camera+LiDAR linking output 156). In some embodiments, LiDAR labeling may involve first labeling LiDAR frames with 2D bounding boxes, then labeling the LiDAR frames with 3D bounding boxes or cuboids (e.g., 3D LiDAR labeling output 155). The labeling tool and this example annotation project are described in more detail below.

Continuing with the high-level overview, after labelers have completed the annotation tasks in the project, post-processing 160 may be applied to generate annotations that humans typically are not capable of producing, such as generating depth values. In some embodiments, quality assurance check 170 may be performed on the labeled data to identify potential errors and tag certain annotation scenes for rework. In some embodiments, quality assurance check 170 may be incorporated at least in part into an annotation task during annotation 150, such as a link task, which may eliminate the need for a separate quality assurance check after post-processing 160. After some or all annotations tasks have been completed, the resulting ground truth data may be exported from the labeling tool in any suitable format, whether automatically or manually triggered (ground truth data export 180), and the ground truth data may be consumed (ground truth data consumption 190), for example, by using the ground truth data to train a corresponding DNN.

Generally, ground truth data may be generated at least in part from real-world data. Accordingly, to perform data capture 110 in some embodiments, one or more vehicles (e.g., vehicle 1400 of FIGS. 14A-D) may collect sensor data from one or more sensors of the vehicle(s) in real-world (e.g., physical) environments. The sensors of the vehicle(s) may include, without limitation, global navigation satellite systems sensor(s) 1458 (e.g., Global Positioning System sensor(s)), RADAR sensor(s) 1460, ultrasonic sensor(s) 1462, LiDAR sensor(s) 1464, inertial measurement unit (IMU) sensor(s) 1466 (e.g., accelerometer(s), gyroscope(s), magnetic compass(es), magnetometer(s), etc.), ego-motion sensor(s), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle(s)), vibration sensor(s) 1442, steering sensor(s) 1440, brake sensor(s) (e.g., as part of the brake sensor system 1446), and/or other sensor types. The vehicle(s) may include autonomous vehicles, semi-autonomous vehicles, non-autonomous vehicles, and/or may include objects or vehicles other than vehicles 1400, such as robots, drones, watercraft, aircraft, unmanned aerial vehicles (UAVs), etc.

The vehicle(s) may include various types of vehicle hardware. For example, the vehicle hardware may be responsible for managing the sensor data generated by the sensors (e.g., using a sensor manager of an autonomous driving software stack being executed by the vehicle hardware). In some embodiments, the vehicle(s) may include an autonomous driving software stack with a world state manager that manages the world using one or more maps (e.g., 3D maps), localization component(s), perception component(s), and/or the like. The autonomous driving software stack may include planning component(s) (e.g., as part of a planning layer), control component(s) (e.g., as part of a control layer), actuation component(s) (e.g., as part of an actuation layer), obstacle avoidance component(s) (e.g., as part of an obstacle avoidance layer), and/or other component(s). Generally, in some embodiments, the vehicle hardware may include hardware that is used to control the vehicle(s) through real-world environments based on the sensor data, one or more machine learning models (e.g., neural networks), and/or the like. As such, various types of vehicle hardware may be configured for installation within the vehicle and/or for use by the vehicle in executing an autonomous driving software stack that at least in part controls navigation of the vehicle through a real-world physical environment(s).

Generally, data capture 110 may involve capturing sensor data by observing a real-world environment with different types of sensors (sensor modalities), such LiDAR and one or more cameras mounted on a vehicle. Generally, sensor data may be obtained from different sensors at different frequencies for various reasons, such as differences in delay lines, differences in sampling frequencies (e.g., cameras running at 30 fps vs. LiDAR running at 10 fps), different trigger times, and other reasons. In order to facilitate grouping and to present sensor data of similar world states (e.g., sensor data captured at substantially the same time), sensor data alignment 120 may be performed to synchronize the sensor data from the different sensor modalities. In some embodiments, a particular sensor may be used as a reference sensor. Non-reference sensors may be referred to as child sensors. For a given frame of sensor data from the reference sensor (reference frame), an offset such as a time delta may be identified between the reference frame and the temporally closest frame of sensor data from each child sensor. The offset for each child sensor may be recorded and/or applied to the capture times or some other index for the sensor data from the child sensor.

Figure 2:
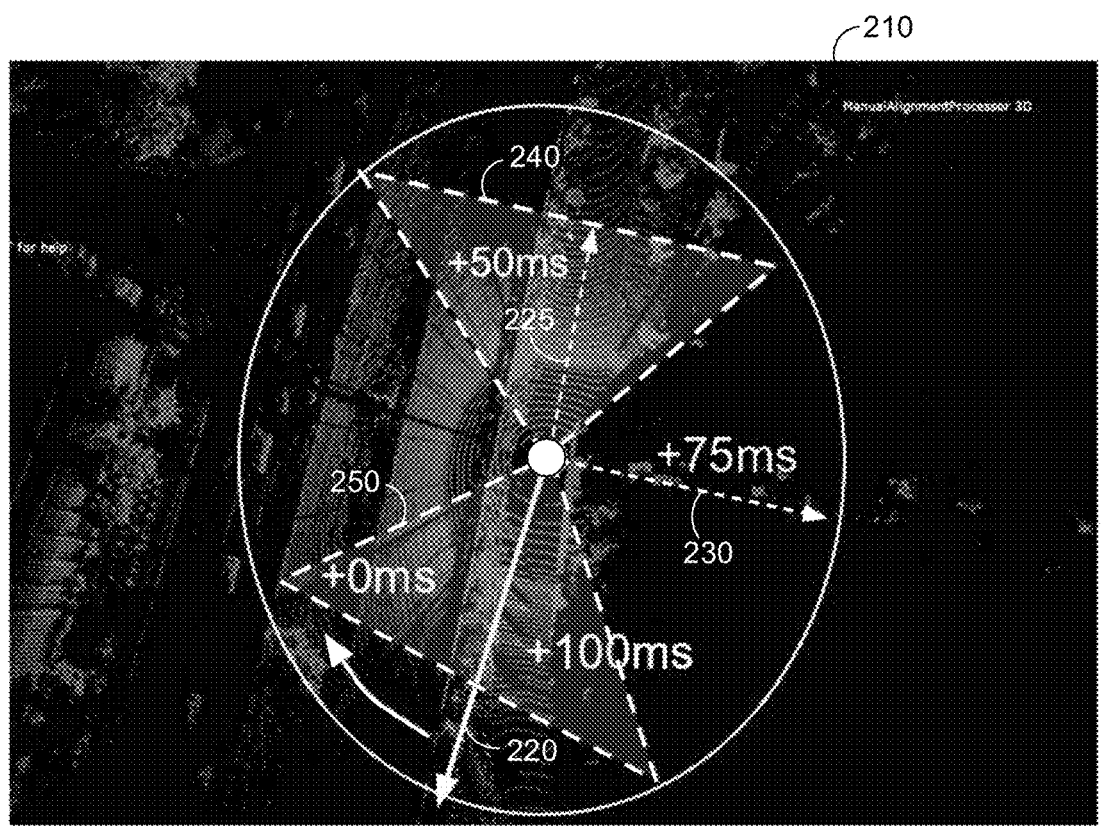
FIG. 2 is a diagram illustrating an example alignment between a LiDAR spin and two cameras, in accordance with some embodiments of the present disclosure.
Figure 2:
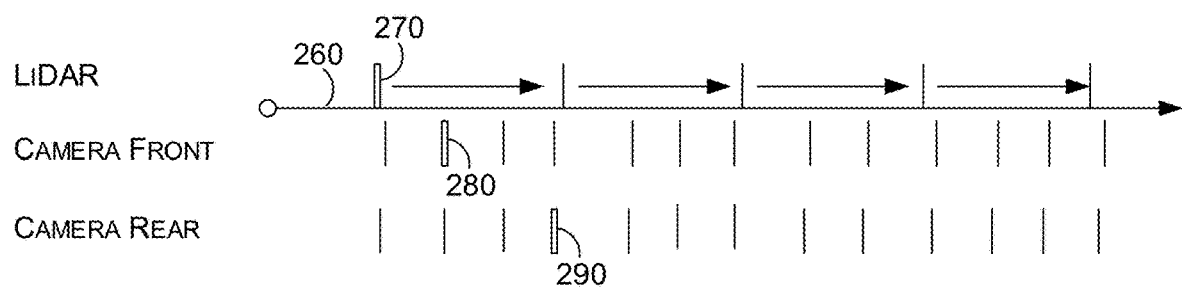

Taking LiDAR and cameras as a specific example, in some embodiments, LiDAR may be selected as the reference sensor, and the temporally closest frame for each camera may be selected based on the viewing angle of the camera relative to the LiDAR spin start angle, and per-camera time or index offsets may be applied relative to LiDAR spin start. FIG. 2 is a diagram illustrating an example alignment between a LiDAR spin and two cameras, in accordance with some embodiments of the present disclosure. Consider a completed LiDAR spin with a reference timestamp t, which refers to when the spin has started (t+0 ms). Using an example LiDAR sensor, assume it takes 100 ms to complete a spin (spin duration), and the spin frequency is 10 Hz. In FIG. 2, an example LiDAR frame 210 has been superimposed with a circle to represent the progress of the LiDAR spin over time. In this example, arrow 220 represents the orientation of the center of the field of view of the LiDAR spin at time t+0 ms, when the spin has started. The spin advances in a clock-wise direction to arrow 225 at t+50 ms, to arrow 230 at t+75 ms, and back to arrow 220 at t+100 ms, which indicates where the spin has ended.

In FIG. 2, the fields of view of two cameras, front-facing camera 240 and rear-facing camera 250, have also been superimposed on top of LiDAR frame 210. In order to identify the frame from each camera that is temporally closest to LiDAR frame 210, the progress and orientation of the LiDAR spin with respect to each camera may be determined, and an offset relative to LiDAR may be determined for each camera based on when the LiDAR spin reaches the field of view of the camera. For example, at t+50 ms (arrow 225), the LiDAR spin has progressed into the field of view of front-facing camera 240, so an offset of 50 ms may be used for front-facing camera 240. For some child sensors such as rear-facing camera 250, the sensor data observed by the child sensor may have sectors that correspond to disjoint or incomplete portions of a LiDAR spin, and it therefore may not be possible to choose a particular frame of sensor data from the child sensor that aligns perfectly with the LiDAR spin. Generally, any frame of the sensor data from the child sensor may be selected. In the example illustrated in FIG. 2, the frame captured at or near the end of the LiDAR spin at t+100 ms (arrow 220) may be selected.

An example frame selection and corresponding offsets are illustrated on axis 260, with reference frame 270 (e.g., representing LiDAR frame 210), frame 280 (e.g., representing front-facing camera 240), and frame 290 (e.g., representing rear-facing camera 250). Note that the temporally closest frame of sensor data captured by a child sensor may not align perfectly with the portion of the LiDAR spin representing the center of the field of view of the child sensor. For example, a LiDAR frame (e.g., reference frame 270) may represent a world state that would correspond to an image from a front-facing camera captured at 50 ms, but the temporally closest image captured by that camera may have been captured at 40 or 45 ms (e.g., frame 280). In that case, the image captured at 45 ms may be selected and paired with LiDAR frame, and/or a corresponding offset (e.g., 45 ms) may be identified and associated with the corresponding child sensor (e.g., front-facing camera 240).

Generally, the offset identified for each child sensor may be recorded and/or applied to the capture times or other index for the sensor data from the child sensor. For example, assume a sensor setup produces raw sensor data, where the sensor data from each sensor is separately indexed. In some embodiments, the identified offset for a particular child sensor may be applied to adjust the indices of the sensor data (or identify indices of aligned sensor data) for the child sensor. Thus, determining and/or applying per-sensor offsets may serve to align the different types of sensor data (e.g., by aligning their indices). FIG. 3 is a table illustrating an example alignment of sensor data indices, in accordance with some embodiments of the present disclosure. In this example, indices of sensor data are illustrated in column 320 (LiDAR frame indices) and columns 330-360 (indices for images captured by different cameras). In this example, a chronological scene index is included in column 310, and for each scene index value, a corresponding row in the table contains the indices that identify the aligned sensor data (e.g., for a particular annotation scene). In this example, an identified offset for each child sensor (e.g., each camera) has been applied relative to each reference frame to identify a corresponding index for a temporarily closest frame of sensor data captured by the child sensor.

Returning to FIG. 1, scene generation 130 may be performed to compose a sequence of annotation scenes (e.g., sets of sensor data taken at approximately the time, such as scene sequence 145). Generally, reference and child sensor data may be sampled using the identified offset(s). If raw sensor data is not in an image format (e.g., a LiDAR or RADAR point cloud), in some embodiments, the raw sensor data (e.g., the point cloud) may be projected to form a projection image (e.g., a top-down image). Continuing with the example where LiDAR is used as a reference sensor and cameras are used as child sensors, for each frame of LiDAR data (e.g., a LiDAR point cloud), an annotation scene may be composed by projecting the LiDAR point cloud to generate a projection image (e.g., a top-down image) and sampling images from each of the cameras (e.g., based on corresponding offsets and/or indices) to identify the temporarily closest image captured by each camera. The projection image (LiDAR frame) and camera images (camera frames and/or a composite image or panorama stitched together from multiple images) may be packaged, grouped, or otherwise associated with one another as an annotation scene. The process may be repeated, for example, to generate or otherwise identify an annotation scene for each reference frame. In some embodiments, scene curation 140 may be performed to select one or more segments of annotation scenes (e.g., a segment of a data capture session without rain) and designate the segment(s) for labeling.

Figure 4:
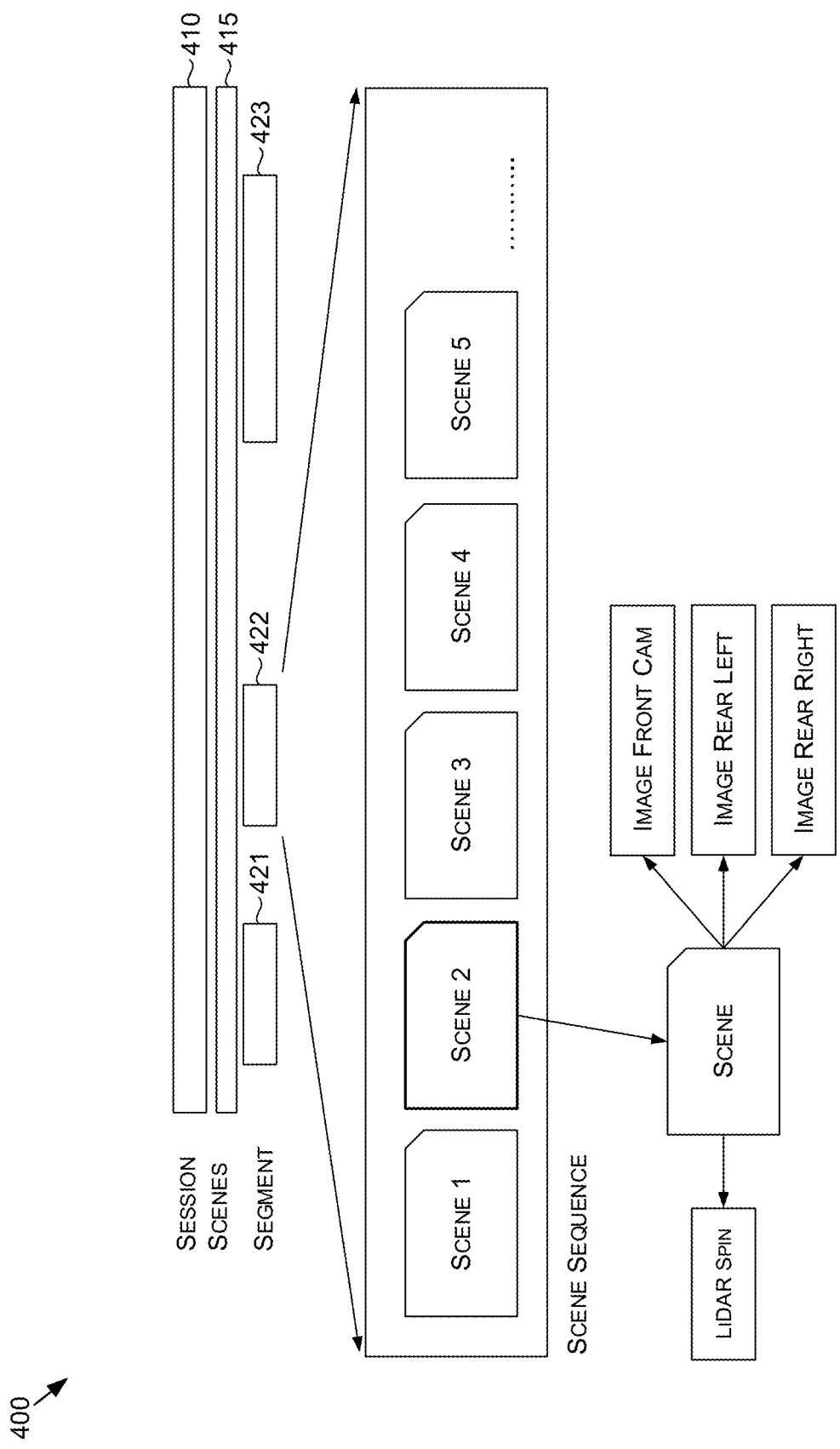
FIG. 4 is a diagram illustrating an example of a data capture session, annotation scenes, and segments of annotation scenes, in accordance with some embodiments of the present disclosure.

FIG. 4 is a diagram illustrating an example of a data capture session 410, annotation scenes 415, and segments 421, 422, 423 of annotation scenes, in accordance with some embodiments of the present disclosure. Assume, for example, data capture session 410 is executed through the downtown of a large city, with sensors capturing sensor data periodically during the data capture session 410. By way of non-limiting example, LiDAR spins may occur every 100 ms, and a set of cameras may each take a picture once every 25 ms (or some other increment). Scenes 415 may be composed from the captured data (in FIG. 4, divisions between consecutive scenes are not illustrated). In some cases, not all scenes will be useful. For example, in a city that experiences precipitation frequently, scenes 415 may be filtered out to remove scenes 415 that were captured when it rained during data capture session 410 (e.g., because there were raindrops on the windshield or lens). Generally, any type of filter may be applied (e.g., automatically or manually, based on numerical or visual characteristics, metadata tags, timestamps, or otherwise). As such, scenes 415 may be curated to identify particular segments of interest (e.g., segments 421, 422, 423), and the scenes within the identified segments (e.g., sensor data from different sensor modalities) may be designated (e.g., tagged or otherwise identified) for annotation.

Returning now to FIG. 1, annotation 150 may be performed by human labelers using a software tool (also called a labeling tool) such as a web tool. Generally, the software tool may include one or more interfaces (e.g., graphical user interfaces) that accept inputs from a project administrator identifying and/or providing the annotation scenes to be labeled (e.g., sensor data from the different sensor modalities) and one or more annotation tasks. The desired annotations may be decomposed and/or arranged into a set of linear tasks forming a labeling recipe, and an encoded representation of the tasks may be entered into the labeling tool. The different tasks may be split up—and the labeling tool may be configured to split up and/or encode tasks—based on sensor type, type or class of object to be labeled (e.g., in a given task, only label cars, traffic signs, or some other element in a road scene), level of annotation detail (e.g., in a given task, label bounding boxes vs. silhouettes, only apply polylines for an object footprints, apply full 3D bounding boxes, apply top down 2D bounding boxes in LiDAR then upgrade to 3D in subsequent pass), and/or otherwise. In some embodiments, separate tasks may be entered for labeling of obstacles, vehicles (e.g., cars, buses, trucks, etc.), vulnerable road users (e.g., motorcycles, bikes, pedestrians, etc.), environmental parts (e.g., drivable space, sidewalks, buildings, trees, poles, etc.), subclasses thereof (e.g., walking pedestrian), some combination thereof, and/or others.

The annotation tasks may be entered or otherwise encoded into the labeling tool, and the labeling tool may orchestrate performance of the different annotation tasks. For example, the labeling tool may assign tasks to labelers in any suitable manner, such as by assigning tasks based on labeler availability, specified task order, or otherwise. In some embodiments, the labeling tool may arrange the order of inputs (e.g., annotations) for a particular task using a wizard that guides labelers through the task(s). During some tasks, each type of sensor data in an annotation scene may be presented to the labeler (e.g., side-by-side), and/or information may be projected across sensor modalities to provide useful contextual information, such as correspondences among the different types of sensor data.

Generally, the labeling tool may accept inputs specifying ground truth annotations (e.g., boundaries, enclosed regions, class labels), and the labeling tool may associate the annotations with the sensor data. Sensor data (e.g., a frame of LiDAR data, an RBG image) may be annotated (e.g., manually, automatically, etc.) with labels or other markers identifying the locations, geometry, orientations, and/or classes of the instances of the relevant objects in the sensor data. The annotations may be entered into the labeling tool using 2D and/or 3D drawing functionality, another type of suitable software functionality, and/or may be hand drawn and imported. Generally, annotations may be synthetically produced (e.g., generated from computer models or renderings), real produced (e.g., designed and produced from real-world data), machine-automated (e.g., using feature analysis and learning to extract features from data and then generate labels), human annotated (e.g., a labeler, or annotation expert, inputting the annotations), and/or a combination thereof (e.g., a human identifies vertices of polylines, a machine generates polygons using polygon rasterizer). Generally, the annotations may comprise 2D and/or 3D bounding boxes, closed polylines, or other bounding shapes drawn, annotated, superimposed, and/or otherwise associated with the sensor data.

By way of non-limiting example involving cameras and LiDAR, an annotation project may be designated with ordered annotation tasks such that initially some or all camera images in a sequence are labeled, then some or all LiDAR frames in the sequence are labeled (e.g., first top down 2D bounding boxes, then 3D bounding boxes), objects appearing in multiple annotation scenes are then linked (e.g., for camera images and LiDAR frames that have already been labeled), and then objects appearing in multiple sensor modalities are linked together. In some embodiments, the labeling tool may simultaneously present both types of sensor data in an annotation scene (e.g., a LiDAR frame and a camera image) during a particular annotation task, and/or may project information across sensor modalities to provide useful contextual information, such as correspondences among the different types of sensor data. In some embodiments, an assistive feature may iterate through annotated objects from the previous frame and prompt the labeler to find the corresponding object in the current frame.

Figure 5:
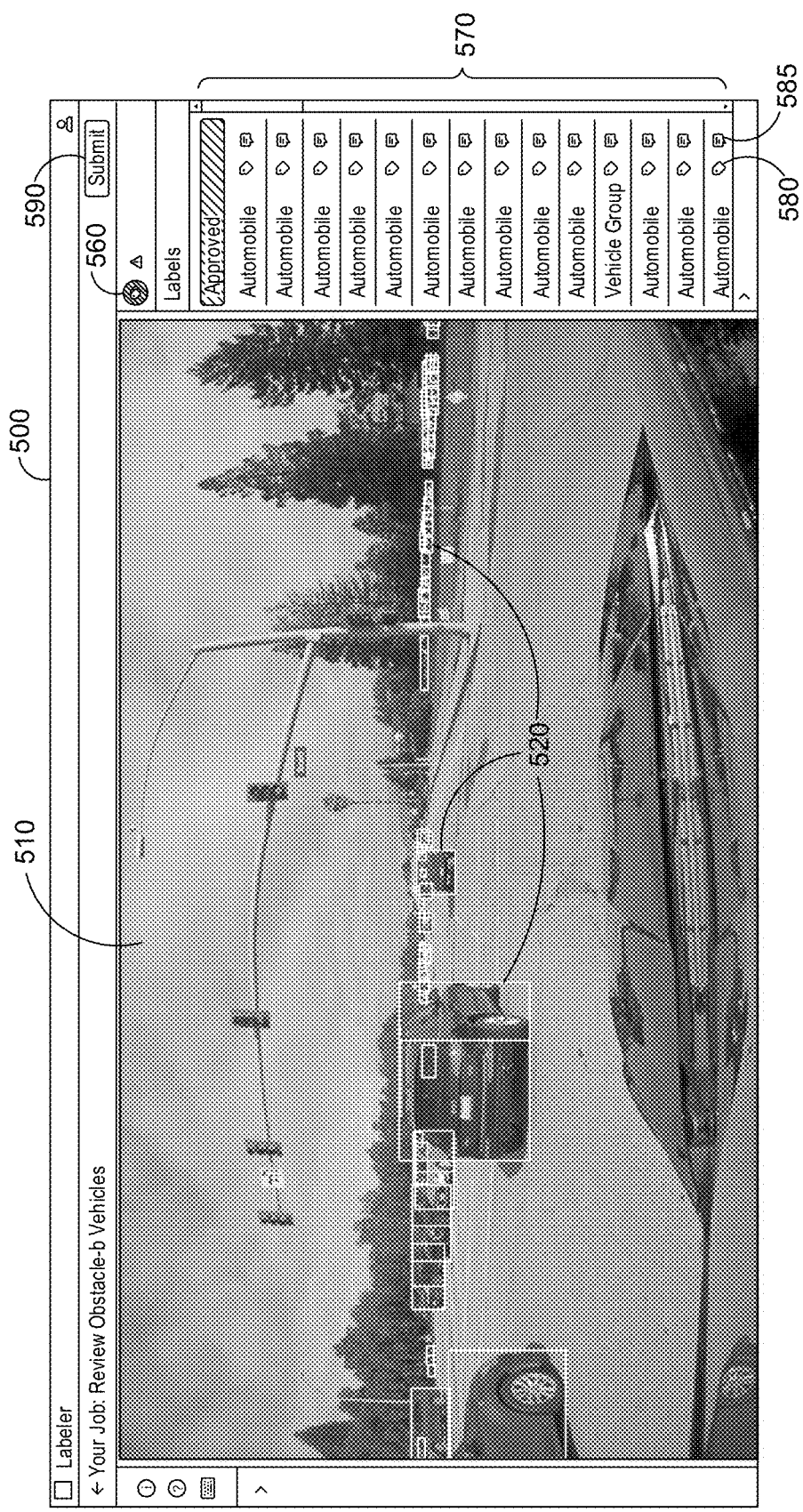
FIG. 5 is an illustration of an example user interface for image labeling, in accordance with some embodiments of the present disclosure.
Figure 6:
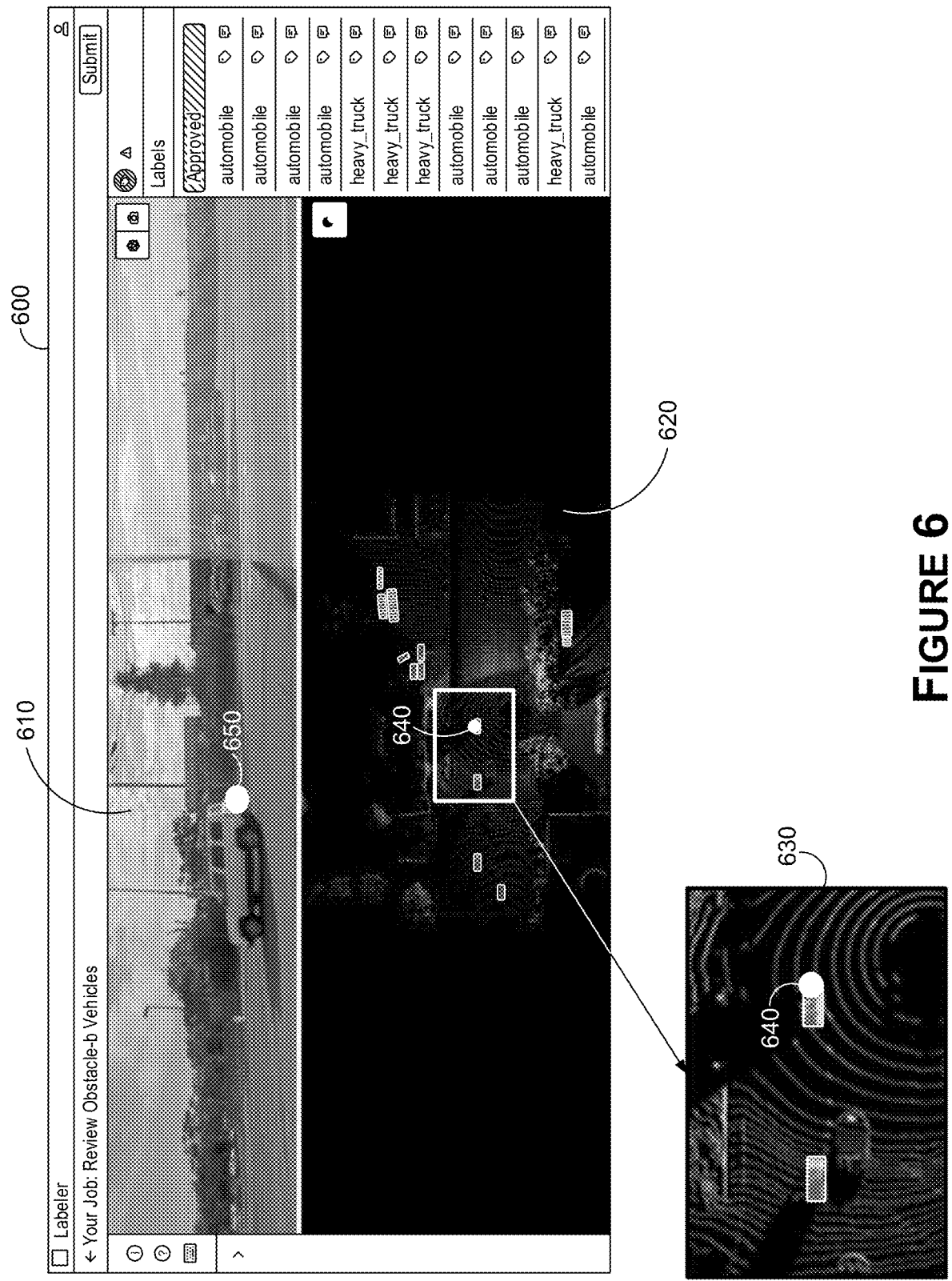
FIG. 6 is an illustration of an example user interface for camera-assisted LiDAR labeling, in accordance with some embodiments of the present disclosure.
Figure 7:
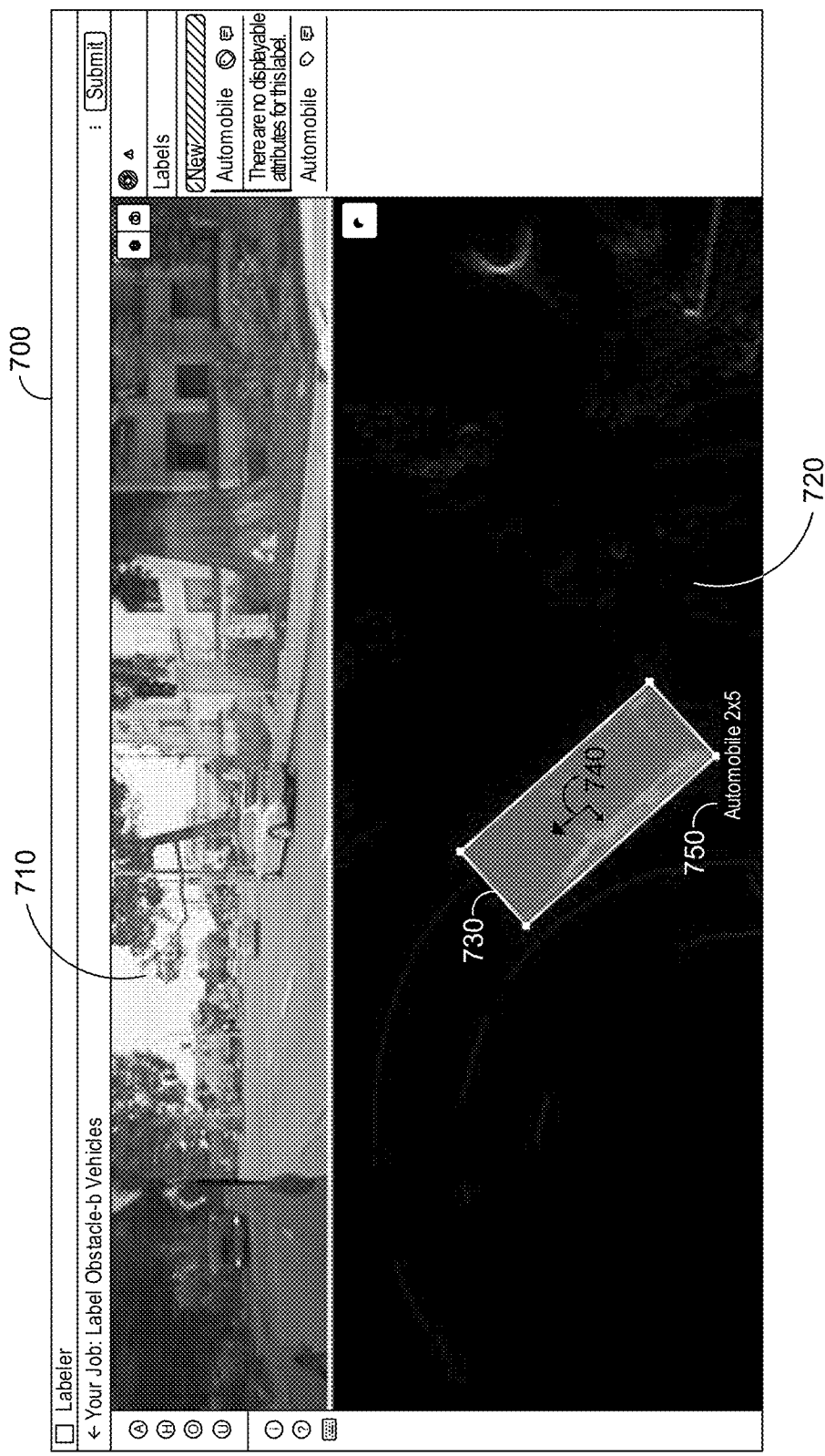
FIG. 7 is an illustration of an example user interface for camera-assisted LiDAR labeling with an orientation vector, in accordance with some embodiments of the present disclosure.
Figure 8:
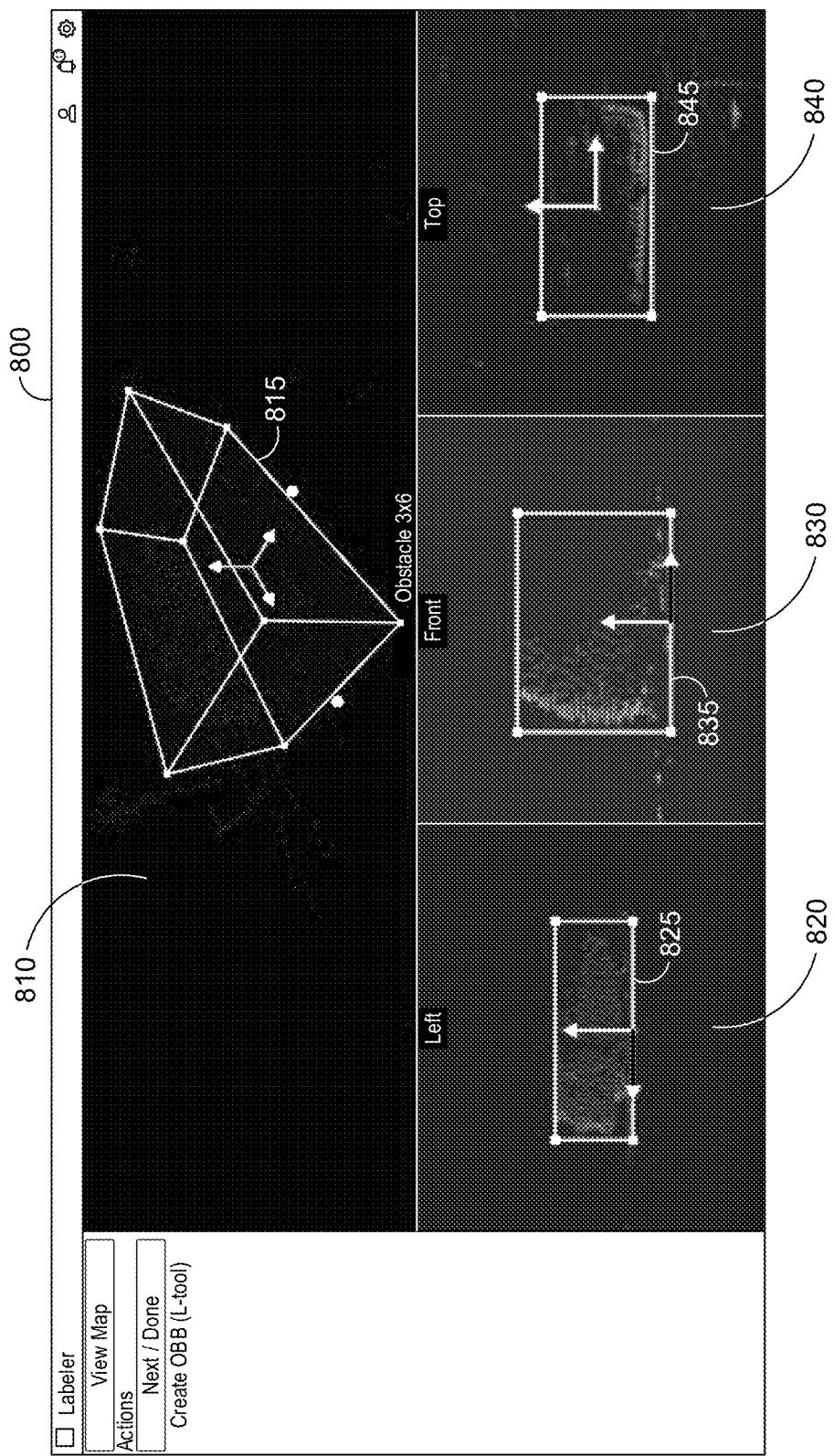
FIG. 8 is an illustration of an example user interface for camera-assisted LiDAR labeling with three dimensional (3D) bounding boxes, in accordance with some embodiments of the present disclosure.
Figure 9:
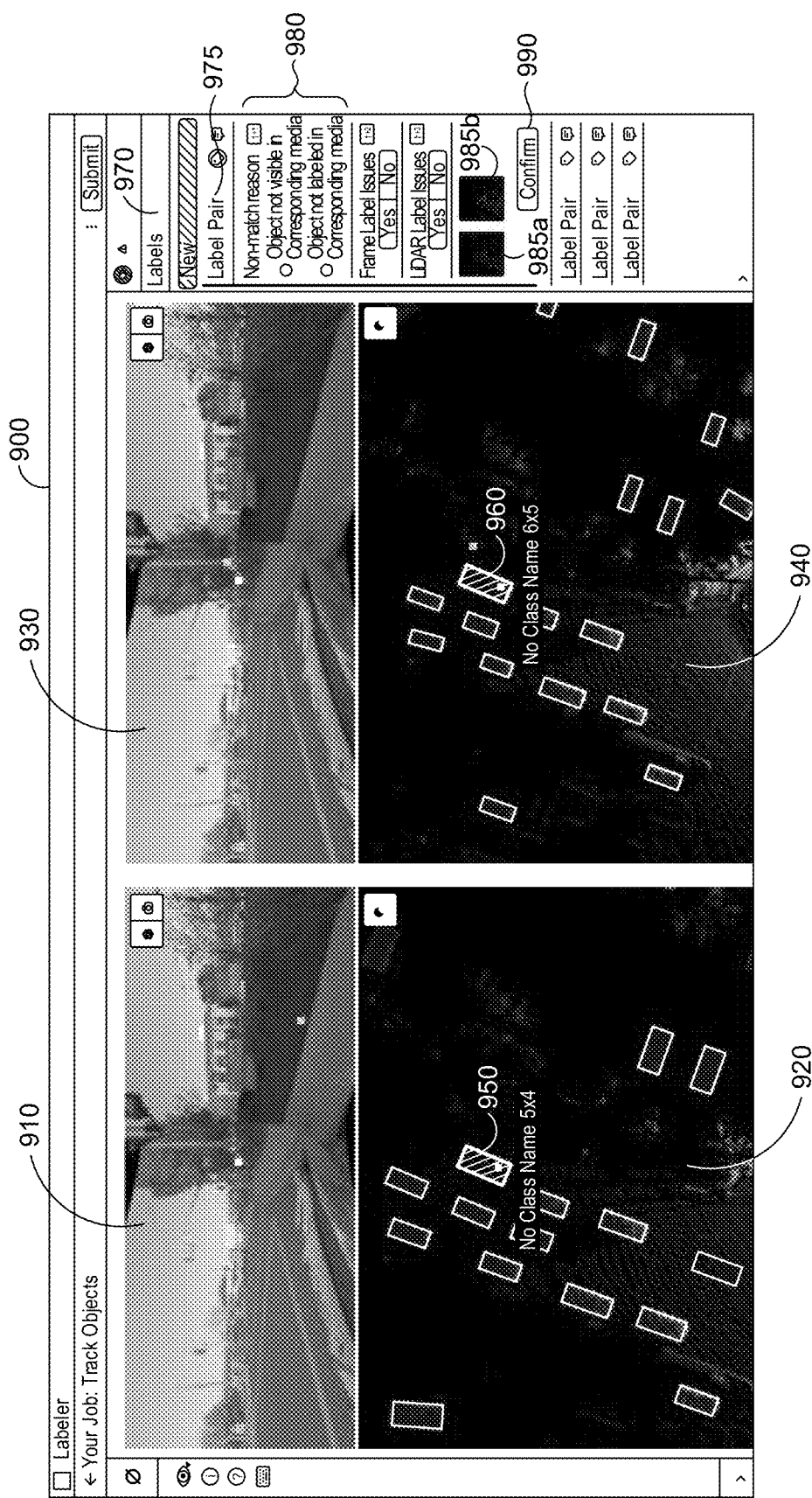
FIG. 9 is an illustration of an example user interface for LiDAR tracking, in accordance with some embodiments of the present disclosure.
Figure 10:
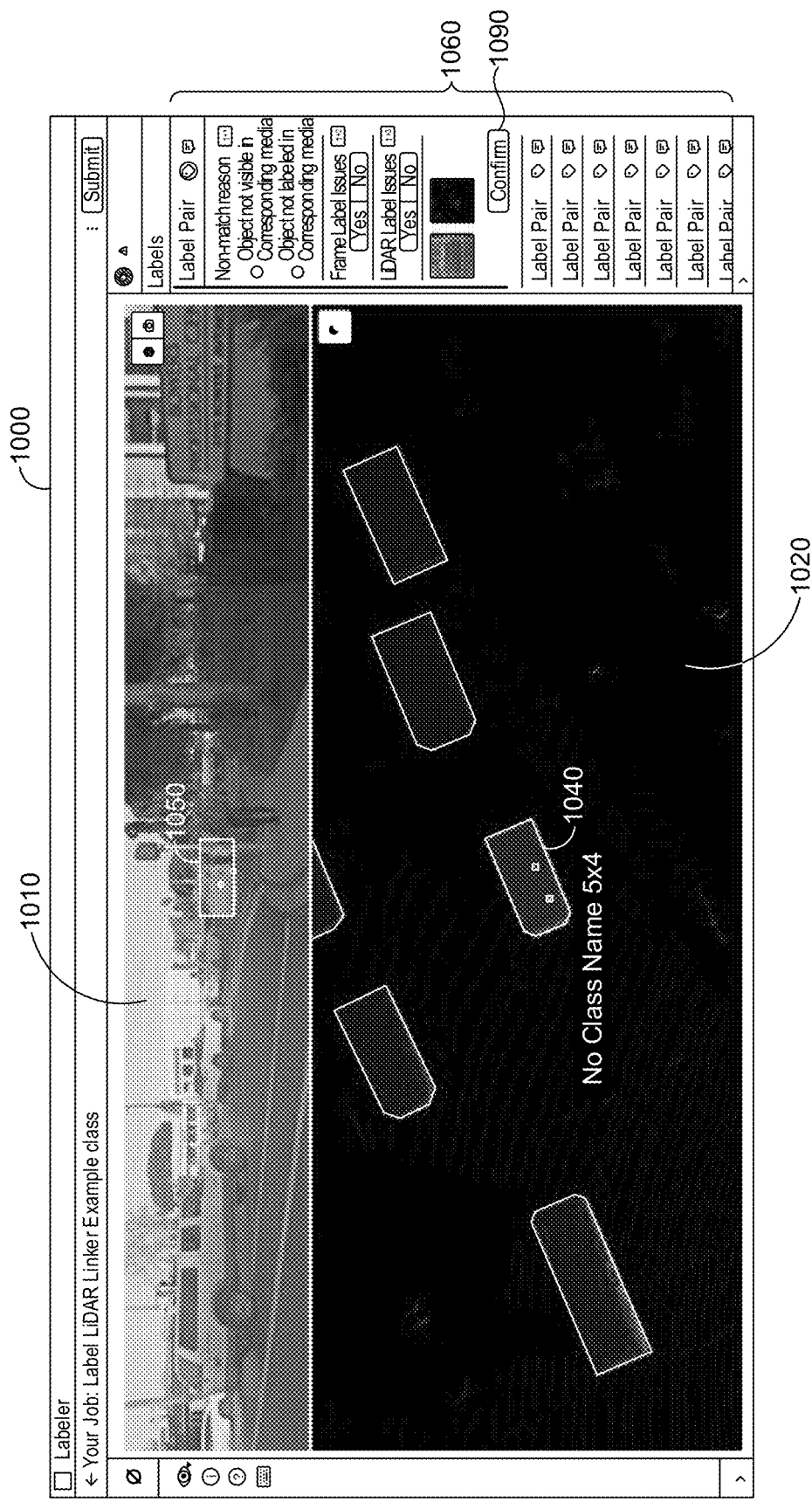
FIG. 10 is an illustration of an example user interface for camera-LiDAR linking, in accordance with some embodiments of the present disclosure.

Continuing with the example involving cameras and LiDAR, FIGS. 5-10 illustrate example user interfaces of a labeling tool for assisted 3D ground truth labeling of LiDAR and camera frames. Consider an example annotation project that includes a first annotation task in which a labeler(s) initially annotates some or all camera images in a sequence, a second annotation task in which a labeler(s) annotates top down 2D bounding boxes in a first pass of some or all LiDAR frames in the sequence, a third annotation task in which a labeler(s) annotates 3D bounding boxes in a second pass of the labeled LiDAR frames in the sequence, a fourth annotation task in which a labeler(s) links the same object across different annotation scenes in the sequence, and a fifth annotation task in which a labeler(s) links the same object across LiDAR and camera frames in each annotation scene in the sequence. FIG. 5 is an illustration of an example user interface for image labeling (e.g., the first annotation task), FIGS. 6-8 are illustrations of example user interfaces for camera-assisted LiDAR labeling (e.g., the second and third annotation tasks), FIG. 9 is an illustration of an example user interface for LiDAR tracking (e.g., the fourth annotation task), and FIG. 10 is an illustration of an example user interface for camera-LiDAR linking (e.g., the fifth annotation task), in accordance with some embodiments of the present disclosure.

Turning now to FIG. 5, FIG. 5 illustrates an example user interface 500 for image labeling, in accordance with some embodiments of the present disclosure. User interface 500 includes a panel that presents a particular camera image 510 to be labeled, and a labeling panel with various interaction elements that activate various drawing and/or annotation functions. In this example, the labeling panel includes tag button 560, which when active, allows a user to identify and label a boundary and/or corresponding enclosed region of image 510. Generally, user interface 500 may incorporate any known 2D or 3D drawing or annotation software functionality. By way of non-limiting example, a user may designate polygons such as a 2D bounding box by clicking in image 510 (e.g., at a location identifying an initial corner of the bounding box), dragging to extend the 2D bounding box from the initial corner, and releasing when the bounding box is the desired size (e.g., at a location identifying a second corner opposite the initial one). In some embodiments, user interface 500 may allow the user to zoom and/or pan across image 510. As such, the user may draw or otherwise identify any number of regions (e.g., regions 520). In some embodiments (e.g., in any of user interfaces 500-1000), the labeling tool may initialize a set of annotations with the annotations from the previous frame of sensor data, and the labeler may adjust the annotations to fit the current frame. As such, the labeling tool may reduce or eliminate the need to re-create an annotation for the same object over and over again.

In some embodiments (e.g., any of user interfaces 500-1000), the labeling tool may include a labeling panel that includes a list (e.g., list 570) or other identification of annotated objects in a particular frame of sensor data. Each entry in the list may include one or more interaction elements such as tag button 580 and comment button 585. Tag button 580 (or some other interaction element) may serve to select or identify a corresponding annotation in the image (e.g., to enable an input editing the annotation), prompt the user to select or edit a class label, or otherwise. Comment button 585 may accept a textual input specifying any notes about the annotation. These are meant merely as examples, and any suitable drawing or annotation functionality may be incorporated into the labeling tool. In some embodiments, the labeling tool may accept an input navigating back and forth in time (i.e., the previous and next frames in a sequence) to improve the user's understanding of the data. When the user is done labeling the image, the user may provide an indication that the user is finished (e.g., by clicking on submit button 590).

FIG. 6 is an illustration of an example user interface 600 for camera-assisted LiDAR labeling, in accordance with some embodiments of the present disclosure. User interface 600 includes a panel that presents a particular LiDAR frame 620 to be labeled. In some embodiments, user interface 600 may simultaneously present a particular LiDAR frame 620 to be labeled, as well as a corresponding image 610 from the same annotation scene. For example, the presented image may be a spatially registered 360-degree view image composed of images in the same annotation scene, from surrounding cameras, stitched together to form a composite image. Generally, user interface 600 may present a visualization of correspondences (e.g., corresponding regions) between LiDAR frame 620 and image 610. In some embodiments, user interface 600 may allow the user to zoom and/or pan in one of the frames, and user interface 600 may make a corresponding adjustment to the other.

In some embodiments, the labeling tool may project information across sensor modalities to illustrate correspondences across the sensor data. For example, a known orientation and location of a camera that captured a particular image may be used to un-project the image into a 3D representation of the environment (e.g., 3D LiDAR coordinates) and identify 3D locations (e.g., in LiDAR space) corresponding to a particular image pixel. To project in the other direction, a particular 3D location in LiDAR space may be projected into image space using the known orientation and location of the camera that captured the image.

Generally, various types of information may be projected from a LiDAR frame into a corresponding image, such as detections (e.g., points, planes), annotations, or other regions. In some embodiments, user interface 600 may project the location of an input probe, which moves with a user's input, across sensor modalities. For example, as the user mouses over LiDAR frame 620, input probe 640 (also illustrated in magnified region 630) may be used to identify a corresponding 3D location in LiDAR space (e.g., by setting a z-value of zero, a z-value of a fitted ground plane, etc.), and the 3D location may be projected into image space to illustrate a corresponding point 650 in image 610. In some embodiments, an input probe may additionally or alternatively be projected in the opposite direction (e.g., a designated point of image 610 may be projected into LiDAR frame 620). By illustrating correspondences across sensor modalities, user interface 600 may provide useful contextual information to help labelers generate more accurate annotations.

In some embodiments, as an initial step for each LiDAR spin, the labeler may be prompted to fit a ground plane to the LiDAR spin. In some embodiments, a fitted ground plane from a previous LiDAR spin may be propagated to the current spin, and the labeler may be prompted to fine-tune the previous plane to the current plane, which may speed up the labeling process. In some embodiments, this data-fitted ground plane may provide a z-value for top-down LiDAR annotations. Thus, received annotations may be aligned to a specified ground plane, which may improve the accuracy of top view annotation. Additionally or alternatively, in some embodiments, user interface 600 may initialize a set of annotations with the annotations from the previous LiDAR spin, and the labeler may adjust the annotations to fit the current spin. As such, the labeling tool may reduce or eliminate the need to re-create an annotation for the same object over and over again.

In some embodiments, user interface 600 may accept input annotations designating 2D polygonal regions of LiDAR frame 620, and/or orientations of objects represented by the 2D polygonal regions. Since LiDAR frame 620 may be a projection of 3D data (e.g., a LiDAR point cloud), an input annotation may be adapted to a corresponding 3D representation in LiDAR space. For example, in some cases where LiDAR frame 620 is a top-down projection image, annotated regions may be created in the XY plane in the LiDAR coordinate system (e.g., with a z-value of zero, a z-value of a fitted ground plane), and the 2D annotated regions may be expanded to 3D (e.g., in a subsequent pass through a sequence of annotation scenes, such as in a subsequent annotation task), as explained in more detail below.

FIG. 7 is an illustration of an example user interface 700 for camera-assisted LiDAR labeling with an orientation vector, in accordance with some embodiments of the present disclosure. Like user interface 600, user interface 700 may accept input annotations designating polygonal regions of LiDAR frame 720. In this example, a labeler has specified bounding box 730. In some embodiments, the labeling tool may accept an input specifying an orientation vector 740 (e.g., by clicking and dragging in the direction of orientation), class label 750, or other type of annotation. Like user interface 600, user interface 700 may present a visualization of correspondences (e.g., corresponding regions) between LiDAR frame 720 and image 710 to assist with an annotation task. In this example, the class and orientation of the object represented in the LiDAR frame 720 are perceptible in image 710. As a result, by presenting image 710 in association (e.g., simultaneously) with LiDAR frame 720, a labeler is able to perceive the class and orientation, and may therefore encode the corresponding annotation(s).

FIG. 8 is an illustration of an example user interface 800 for camera-assisted LiDAR labeling with 3D bounding boxes, in accordance with some embodiments of the present disclosure. In some embodiments, camera-assisted LiDAR labeling may be decomposed into separate tasks for 2D and 3D annotations. 3D annotations may be generated manually and/or automatically. For example, LiDAR labeling may be decomposed into a first pass that accepts inputs specifying 2D annotations (e.g., 2D bounding boxes), and a second pass that accepts inputs adapting the 2D annotations into 3D annotations (e.g., 3D bounding boxes) or a second stage that automatically generates 3D annotations from the 2D annotations (e.g., as part of post-processing 160 of FIG. 1). In an example embodiment that involves accepting inputs adapting 2D annotations into 3D annotations, after receiving a specification of 2D annotations (e.g., bounding boxes) during an initial pass through a sequence of top-down LiDAR frames, the labeling tool may guide a labeler through a per-object procedure. In this example, for each object (e.g., each 2D annotation specified during the first pass), the labeling tool may present an object-aligned, zoomed in view of the object in the current LiDAR frame. For example, the raw data for the current LiDAR frame (e.g., the LiDAR point cloud) may be projected into one or more views, such as a front-facing view of the object (e.g., front-facing view 830), a side-facing view of the object (e.g., side-facing view 820), and a top-down view of the object (e.g., top-down view 840), each of which may be presented in user interface 800. In some embodiments, a 3D representation of the LiDAR point cloud additionally or alternatively may be presented (e.g., 3D view 810).

User interface 800 may prompt the labeler to specify dimensions and/or orientation (e.g., yaw, pitch, roll) of each object in any view(s). In the example where a first pass is made in 2D, an initial 2D annotation may be presented (in each of views 810, 820, 830, 840). Note that a 2D annotation made in a top-down view may be initially visualized as a line in front-facing view 830 and side-facing view 820, and/or may be visualized in all two dimensions in top-down view 840 and 3D view 810. In the example illustrated in FIG. 8, the labeler may adapt a 2D annotation into a 3D annotation or otherwise specify a 3D annotation, for example, by placing vertices, dragging handles, or otherwise defining or manipulating a representation of the annotation in any view (e.g., bounding boxes 815, 825, 835, 845 in respective views 810, 820, 830, 840). In some embodiments, modifying the annotation in one view updates the annotation in any other view where the modification is visible. As such, a labeler may fit a 3D annotation to LiDAR data (e.g., a LiDAR point cloud). After the labeler has specified a 3D annotation for a particular object, the user may submit the annotation (e.g., by clicking on a next button or activating some other interaction element) to advance to the next object in the LiDAR frame.

FIG. 9 is an illustration of an example user interface 900 for LiDAR tracking, in accordance with some embodiments of the present disclosure. In this example, user interface 900 presents consecutive LiDAR frames 910 and 920, as well as respective images 930 and 940 from the same annotation scene. The labeling tool may iterate through the objects in the previous frame (e.g., the annotations entered during a prior annotation task), and user interface 900 may prompt the labeler to find the corresponding annotation (e.g., entered during a prior annotation task) in the current frame. In some embodiments, object detection and tracking may be applied to track the movement of annotated objects from frame to frame over time, and/or initialize a link for confirmation or fine-tuning by a human labeler. In the example illustrated in FIG. 9, labeler may identify annotations 950 and 960 as the same object. In some cases, objects might be occluded in some frames, but not others. As such, in some embodiments, the labeling tool may accept an input linking objects (annotations) across disjoint frames (e.g., jumps).

In some embodiments, user interface 900 may emphasize an estimated region where an object is predicted to be located. For example, one or more positional values of a current or selected object in a first frame (e.g., of LiDAR data) may be adjusted to compensate for a known ego-motion of the sensor that captured the data (e.g., the known ego-motion of a data capture vehicle). By way of non-limiting example, one or more positional values of an annotation of an object (e.g., a bounding box) and/or one or more representative positional values of the object in a first frame of LiDAR data (e.g., a center point of a bounding box, a corner of a bounding box) may be ego-motion compensated, and the user interface 900 may highlight, outline, pan to, zoom to, and/or otherwise emphasize a corresponding predicted region in a second frame of LiDAR data. In an example implementation, as the labeler iterates through labeled objects from a previous annotation scene, user interface 900 may guide a labeler by presenting a visualization of where a labeled object from the previous annotation scene is predicted to be in a subsequent annotation scene, for example, by zooming into an estimated region in the sensor data. As such, user interface 900 may guide a labeler in identifying corresponding objects from scene to scene. In some embodiments, even with relatively low samplings rates, user interface 900 may still provide useful guidance, as ego-motion compensation may still provide useful predictions at lower sampling rates.

In FIG. 9, user interface 900 includes labeling panel 970, which includes various interaction elements that activate corresponding annotation functions. For example, label pair button 975, when active, may allow a user to identify and link annotations (e.g., enter new links). One of non-match reasons 980 may be selected to indicate an annotation from one frame is not visible or not labeled in an adjacent frame. In some embodiments, labeling panel 970 may present thumbnail images (e.g., thumbnails 985a, 985b) of consecutive frames being presented, and may accept an input flagging camera and/or LiDAR frame annotation issues. As such, an annotation task in which annotations are linked across frames of sensor data may serve at least in part as a quality assurance check (e.g., quality assurance check 170 of FIG. 1). When the labeler is finished linking annotations in a pair of adjacent frames, the labeler may confirm 990 the links to advance to the next pair of adjacent frames. Although this example illustrates an annotation task in which a labeler(s) links objects appearing in multiple LiDAR frames, some embodiments additionally or alternatively may include an annotation task in which a labeler(s) links objects appearing in multiple camera frames.

FIG. 10 is an illustration of an example user interface 1000 for camera-LiDAR linking, in accordance with some embodiments of the present disclosure. In this example, user interface 1000 presents LiDAR frame 1020, as well as respective image 1010 from the same annotation scene. The labeling tool may iterate through the objects in the annotation scene (e.g., the annotations entered during a prior annotation task), and user interface 1000 may prompt the labeler to find the corresponding annotation in the other sensor modality. Generally, annotations, object tracks, and/ or object detections from sensor data from a particular sensor may be linked to corresponding annotations, object tracks, and/or object detections for the same object from sensor data from a different sensor. For example, the labeler may identify annotations 1040 and 1050 as the same object.

In some embodiments, user interface 1000 may emphasize an estimated region where an object is predicted to be located. For example, one or more positional values of a current or selected object in a first frame (e.g., a camera frame or LiDAR frame) may be projected into a second frame (e.g., a LiDAR frame or camera frame) and adjusted to compensate for a known ego-motion of the sensor(s) that captured the data (e.g., the known ego-motion of a data capture vehicle). By way of non-limiting example, one or more positional values of an annotation of an object (e.g., a bounding box) and/or one or more representative positional values of an object in a first frame of sensor data (e.g., a center point of a bounding box, a corner of a bounding box) may be projected into a second frame and ego-motion compensated, and the user interface 1000 may highlight, outline, pan to, zoom to, and/or otherwise emphasize a corresponding predicted region in the second frame. As such, user interface 1000 may leverage a known correspondence between sensor modalities to guide the labeler in identifying corresponding objects across sensor modalities.

As with user interface 900, user interface 1000 includes labeling panel 1060, which includes various interaction elements that activate corresponding annotation functions. In some embodiments user interface 900 may accept an input flagging camera and/or LiDAR frame annotation issues. As such, an annotation task in which annotations are linked across sensor modalities may serve at least in part as a quality assurance check (e.g., quality assurance check 170 of FIG. 1). When the labeler is finished linking annotations across sensor modalities in an annotation scene, the labeler may confirm 990 the links to advance to the next pair of adjacent frames. Although the foregoing discussion focused on LiDAR-to-camera linking, any type of sensor data may be linked to any other type of sensor data (including linking between sensor data from two different types of the same sensor, such as camera-to-camera linking). Additionally or alternatively, annotation tasks may be consolidated, re-ordered, split up, or otherwise arranged in other ways. For example, in some embodiments, LiDAR labeling may be performed in the same annotation task as LiDAR-to-camera linking (e.g., after labeling objects in camera images, link and label corresponding objects in LiDAR frames at the same time). These are meant simply as examples, and other variations may be implemented within the scope of the present disclosure.

Figure 11:
FIG. 11 is an illustration of example ground truth annotations, in accordance with some embodiments of the present disclosure.
Figure 11:
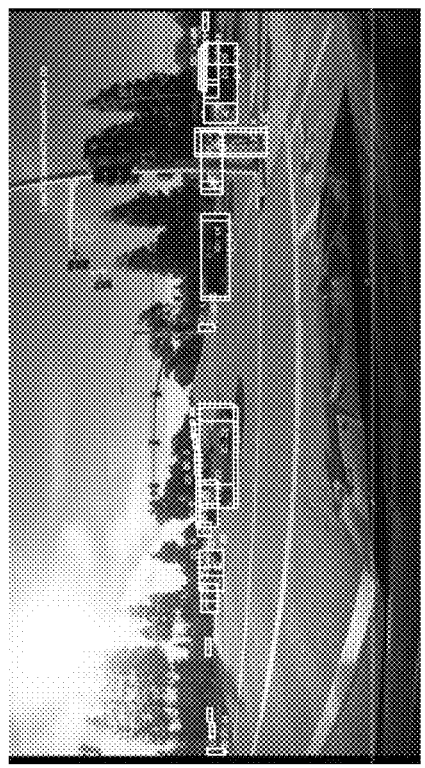
Figure 11:
Figure 11:
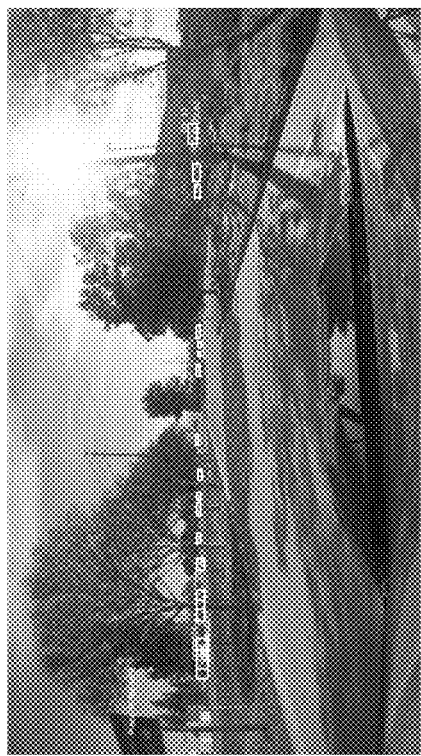

Returning now to FIG. 1, in some embodiments, post-processing 160 may be performed to automatically detect features that humans typically cannot perceive. By way of non-limiting example, image processing may be applied to camera images to determine dense depth value (e.g., using a machine learning model(s) that predicts depth values on a per-pixel basis), and the depth values or a subset thereof (e.g., a representative depth for each annotation, such as a closest or average depth) may be associated with the image. In some cases, post-processing 160 may be re-run (e.g., based on an improved calibration) to re-compute any automatically detected features and/or to improve visualizations of correspondences (e.g., by backprojecting 3D LiDAR labels into a corresponding camera image). In some embodiments, an annotation project may include one or more manual quality assurance checks 170 to confirm the accuracy of annotations that are manually generated by human labelers and/or automatically generated (e.g., during post-processing 160). FIG. 11 is an illustration of example ground truth annotations, in accordance with some embodiments of the present disclosure.

In some embodiments, post-processing 160 may be performed to transform ground truth annotations into an encoded representation matching the view, size, and dimensionality of the output(s) of the machine learning model(s) to be trained. For example, if the machine learning model(s) outputs classification data (e.g., one or more channels, where each channel outputs a different class confidence map), ground truth annotations in a given frame of sensor data may be transformed into a corresponding class confidence map for each class. By way of non-limiting example, for a given class, values of pixels falling within annotated regions of that class may be set to a value indicating a positive classification (e.g., 1), and the values of the other pixels in the image may be set to a value indicating a negative classification (e.g., 0). As such, the different class confidence maps may be stacked to form a ground truth tensor matching the outputs of the machine learning model(s).

In another example, if the machine learning model(s) outputs instance regression data (e.g., one or more channels, where each channel regresses a different type of object instance data such as location, geometry, and/or orientation data, the location, geometry, orientation, and/or class of each of the annotations may be used to generate object instance data matching the view, size, and dimensionality of the output(s) of the machine learning model(s) to be trained. For example, for each pixel contained with an annotation, the annotation may be used to compute corresponding location, geometry, and/or orientation information (e.g., where the object is located—such as the object center—relative to each pixel, object height, object width, object orientation (e.g., rotation angles relative to the orientation of the projection image), and/or the like). The computed object instance data may be stored in a corresponding channel of a ground truth tensor. These are just a few examples, and other types of post-processing 160 additionally or alternatively may be performed.

After some or all the annotation tasks in an annotation project have been completed, the resulting ground truth data may be exported in any suitable format (e.g., ground truth data export 180 of FIG. 1). The ground truth data may be paired with corresponding input training data that matches the type(s) of input(s) accepted by the machine learning model(s) to be trained. As such, one or more machine learning model(s) may be trained using the input training data and exported ground truth data (e.g., ground truth data consumption 190 of FIG. 1). For example, one or more loss functions (e.g., a single loss function, a loss function for each output type such as classification loss and/or regression loss, etc.) may be used to compare the accuracy of the output(s) of the machine learning model(s) to ground truth, and the parameters of the machine learning model(s) may be updated (e.g., using backward passes, backpropagation, forward passes, etc.) until the accuracy reaches an optimal or acceptable level.

Figure 12:
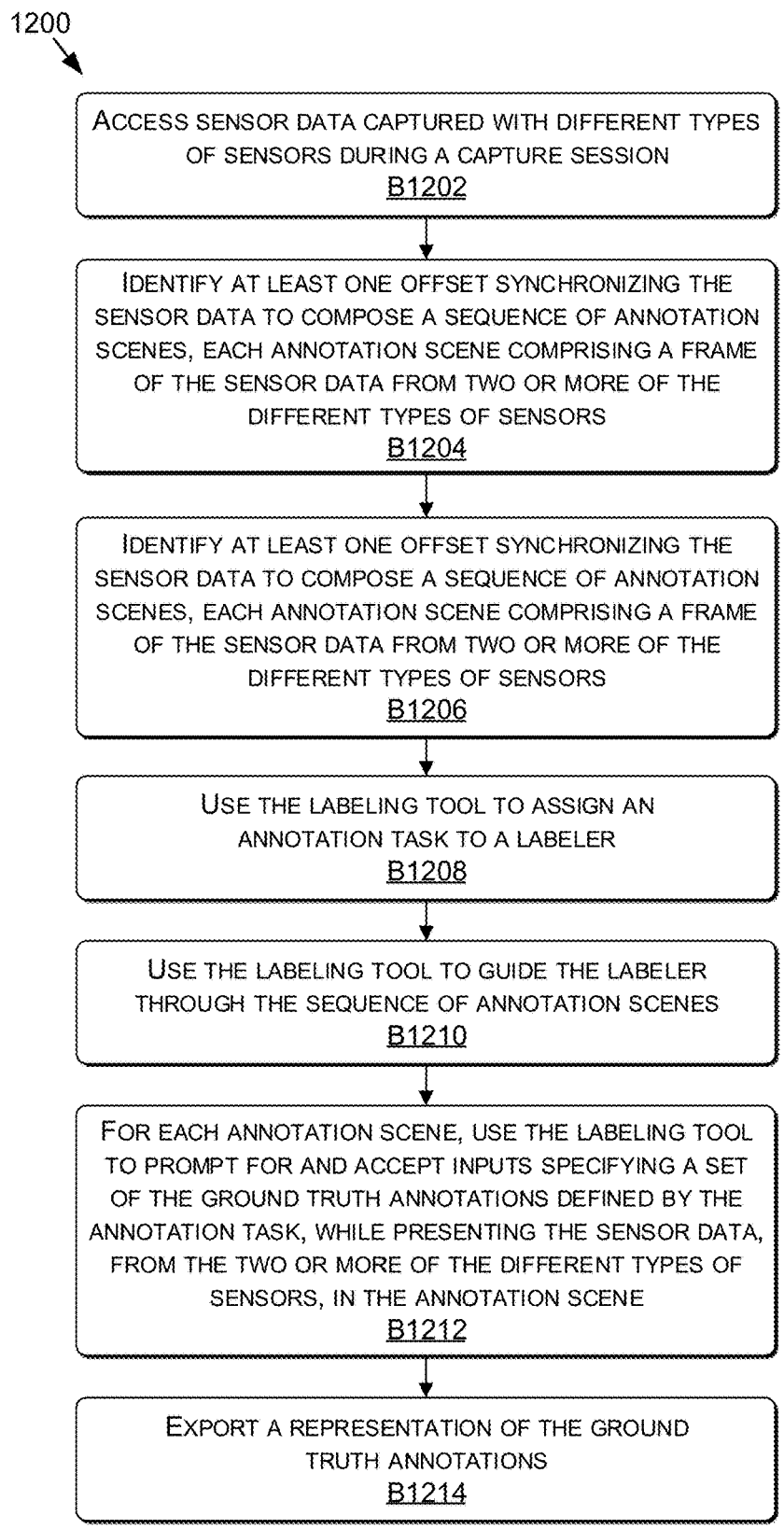
FIG. 12 is a flow diagram showing a method for generating ground truth annotations of sensor data from different types of sensors, in accordance with some embodiments of the present disclosure.
Figure 13:
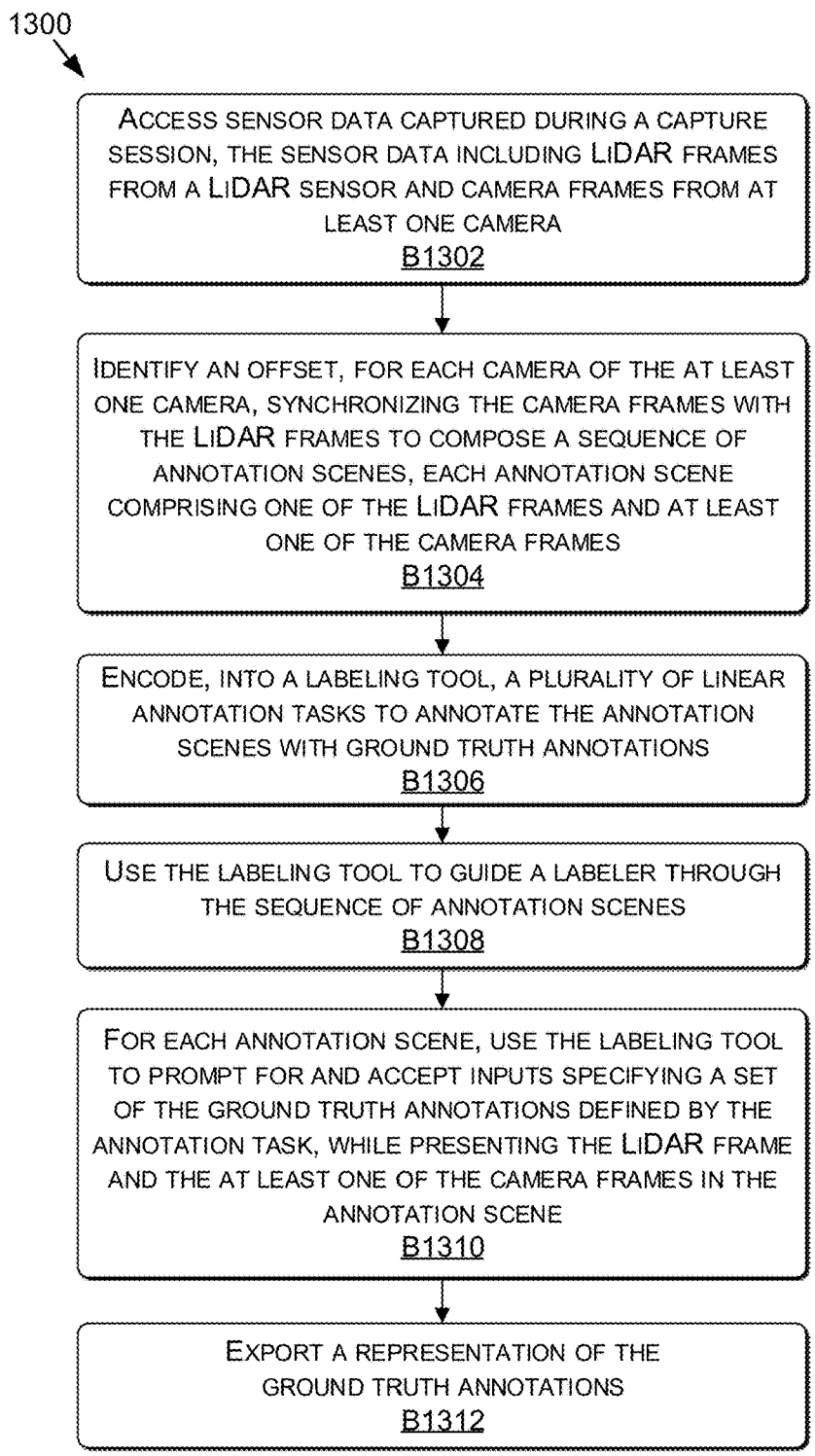
FIG. 13 is a flow diagram showing a method for generating ground truth annotations of LiDAR and camera frames, in accordance with some embodiments of the present disclosure.

Now referring to FIGS. 12 and 13, each block of methods 1200 and 1300, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 1200 and 1300 may be understand, by way of example, with respect to annotation pipeline 100 of FIG. 1. However, these methods may additionally or alternatively be executed by any one system, or any combination of systems, including, but not limited to, those described herein.

FIG. 12 is a flow diagram showing a method 1200 for generating ground truth annotations of sensor data from different types of sensors, in accordance with some embodiments of the present disclosure. The method 1200, at block B1202, includes accessing sensor data captured with different types of sensors during a capture session. For example, one or more vehicles (e.g., vehicle 1400 of FIGS. 14A-D) may collect sensor data from one or more sensors of the vehicle(s) in real-world (e.g., physical) environments (e.g., as part of data capture 110 of FIG. 1). The sensor data may be stored and accessed in any manner.

The method 1200, at block B1204, includes identifying at least one offset synchronizing the sensor data to compose a sequence of annotation scenes, each annotation scene comprising a frame of the sensor data from two or more of the different types of sensors. For example, since sensor data may be obtained from different sensors at different frequencies, the sensor data may be aligned (e.g., sensor data alignment 120 of FIG. 1) to facilitate grouping sensor data of similar world states. In some embodiments, a particular sensor may be used as a reference sensor. Non-reference sensors may be referred to as child sensors. For a given frame of sensor data from the reference sensor (reference frame), an offset such as a time delta may be identified between the reference frame and the temporally closest frame of sensor data from each child sensor. The offset for each child sensor may be recorded and/or applied to the capture times or some other index for the sensor data from the child sensor. Generally, reference and child sensor data may be sampled using the identified offset(s) to identify and compose the frames of sensor data from different sensors for each annotation scene.

The method 1200, at block B1206, includes encoding, into a labeling tool, a plurality of linear annotation tasks to annotate the annotation scenes with ground truth annotations. Generally, the labeling tool may include one or more interfaces (e.g., graphical user interfaces) that accept inputs from a project administrator identifying and/or providing annotation scenes to be labeled (e.g., sensor data from the different sensor modalities) and one or more annotation tasks. The desired annotations may be decomposed into a set of linear tasks, and an encoded representation of the tasks may be entered into the labeling tool (e.g., as part of annotation 150 in annotation pipeline 100 of FIG. 1).

The method 1200, at block B1208, includes using the labeling tool to assign an annotation task to a labeler. For example, as part of annotation 150 in annotation pipeline 100 of FIG. 1, the labeling tool may assign each annotation task to a particular labeler in any suitable manner, such as by assigning tasks based on labeler availability, specified task order, or otherwise.

The method 1200, at block B1210, includes using the labeling tool to guide the labeler through the sequence of annotation scenes. For example, as part of annotation 150 in annotation pipeline 100 of FIG. 1, the labeling tool may arrange the order of inputs (e.g., annotations) for a particular task using a wizard that guides labelers through the task(s).

The method 1200, at block B1212, includes for each annotation scene, using the labeling tool to prompt for and accept inputs specifying a set of the ground truth annotations defined by the annotation task, while presenting the sensor data, from the two or more of the different types of sensors, in the annotation scene. For example, as part of annotation 150 in annotation pipeline 100 of FIG. 1, the labeling tool may arrange the order of inputs for a particular task (e.g., by walking through a per-object annotation procedure for each annotation scene in a sequence). FIG. 6 illustrates an example embodiment in which a labeling tool may simultaneously present sensor data from different types of sensors, and may project information across sensor modalities to illustrate correspondences across the sensor data.

The method 1200, at block B1214, includes exporting a representation of the ground truth annotations. For example, after some or all the annotation tasks in an annotation project have been completed, the resulting ground truth data may be exported in any suitable format (e.g., ground truth data export 180 of FIG. 1).

FIG. 13 is a flow diagram showing a method 1300 for generating ground truth annotations of LiDAR and camera frames, in accordance with some embodiments of the present disclosure. The method 1300, at block B1302, includes accessing sensor data captured during a capture session, the sensor data including LiDAR frames from a LiDAR sensor and camera frames from at least one camera. For example, one or more vehicles (e.g., vehicle 1400 of FIGS. 14A-D) may collect sensor data from one or more sensors of the vehicle(s) in real-world (e.g., physical) environments (e.g., as part of data capture 110 of FIG. 1). The vehicle sensors may include one or more LiDAR sensors and one or more cameras. The captured sensor data may be accessed at any time.

The method 1300, at block B1304, includes identifying an offset, for each camera of the at least one camera, synchronizing the camera frames with the LiDAR frames to compose a sequence of annotation scenes, each annotation scene comprising one of the LiDAR frames and at least one of the camera frames. For example, as a LiDAR spin progresses and views different portions of the environment, the temporally closest camera frame for any given LiDAR spin may be selected based on the viewing angle of the camera relative to the LiDAR spin start angle and how long it takes for the LiDAR spin to align with (e.g., a portion such as the center of) the camera's field of view. Generally, per-camera time or index offsets relative to LiDAR spin start may be determined and/or applied to align camera frames for each camera with LiDAR frames. Thus, each LiDAR frame and a temporally closest camera frame (e.g., for each camera) may be sampled and packaged into a corresponding annotation scene to compose the sequence.

The method 1300, at block B1306, includes encoding, into a labeling tool, a plurality of linear annotation tasks to annotate the annotation scenes with ground truth annotations. Generally, the labeling tool may include one or more interfaces (e.g., graphical user interfaces) that accept inputs from a project administrator identifying and/or providing annotation scenes to be labeled (e.g., sensor data from the different sensor modalities) and one or more annotation tasks. The desired annotations may be decomposed into a set of linear tasks, and an encoded representation of the tasks may be entered into the labeling tool (e.g., as part of annotation 150 in annotation pipeline 100 of FIG. 1).

The method 1300, at block B1308, includes using the labeling tool to guide a labeler through the sequence of annotation scenes. For example, as part of annotation 150 in annotation pipeline 100 of FIG. 1, the labeling tool may arrange the order of inputs (e.g., annotations) for a particular task using a wizard that guides labelers through the task(s).

The method 1300, at block B1310, includes for each annotation scene, using the labeling tool to prompt for and accept inputs specifying a set of the ground truth annotations defined by the annotation task, while presenting the LiDAR frame and the at least one of the camera frames in the annotation scene. For example, as part of annotation 150 in annotation pipeline 100 of FIG. 1, the labeling tool may arrange the order of inputs for a particular task (e.g., by walking through a per-object annotation procedure for each annotation scene in a sequence). FIG. 6 illustrates an example embodiment in which a labeling tool may simultaneously present LiDAR and camera frames, and may project information from LiDAR to camera and/or vice versa.

The method 1300, at block B1312, includes exporting a representation of the ground truth annotations. For example, after some or all the annotation tasks in an annotation project have been completed, the resulting ground truth data may be exported in any suitable format (e.g., ground truth data export 180 of FIG. 1). As such, one or more machine learning model(s) may be trained using the exported ground truth data (e.g., ground truth data consumption 190 of FIG. 1).

Example Autonomous Vehicle

Figure 14A:
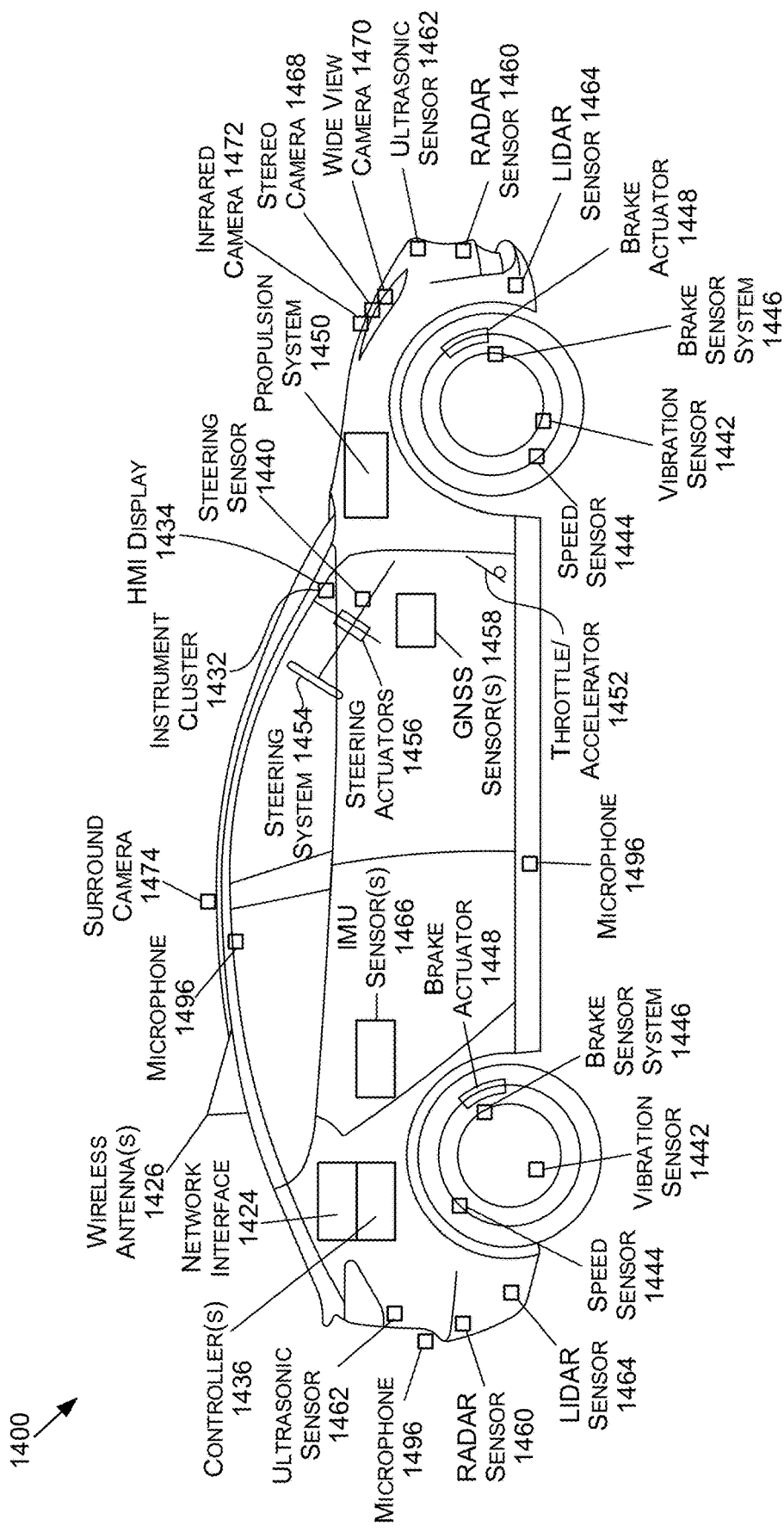
FIG. 14A is an illustration of an example autonomous vehicle, in accordance with some embodiments of the present disclosure.

FIG. 14A is an illustration of an example autonomous vehicle 1400, in accordance with some embodiments of the present disclosure. The autonomous vehicle 1400 (alternatively referred to herein as the "vehicle 1400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1400 may be capable of functionality in accordance with one or more of Level 3-Level 5 of the autonomous driving levels. For example, the vehicle 1400 may be capable of conditional automation (Level 3), high automation (Level 4), and/or full automation (Level 5), depending on the embodiment.

The vehicle 1400 may include components such as a chassis, a vehicle body, wheels (e.g., 2, 4, 6, 8, 18, etc.), tires, axles, and other components of a vehicle. The vehicle 1400 may include a propulsion system 1450, such as an internal combustion engine, hybrid electric power plant, an all-electric engine, and/or another propulsion system type. The propulsion system 1450 may be connected to a drive train of the vehicle 1400, which may include a transmission, to enable the propulsion of the vehicle 1400. The propulsion system 1450 may be controlled in response to receiving signals from the throttle/accelerator 1452.

A steering system 1454, which may include a steering wheel, may be used to steer the vehicle 1400 (e.g., along a desired path or route) when the propulsion system 1450 is operating (e.g., when the vehicle is in motion). The steering system 1454 may receive signals from a steering actuator 1456. The steering wheel may be optional for full automation (Level 5) functionality.

The brake sensor system 1446 may be used to operate the vehicle brakes in response to receiving signals from the brake actuators 1448 and/or brake sensors.

Controller(s) 1436, which may include one or more system on chips (SoCs) 1404 (FIG. 14C) and/or GPU(s), may provide signals (e.g., representative of commands) to one or more components and/or systems of the vehicle 1400. For example, the controller(s) may send signals to operate the vehicle brakes via one or more brake actuators 1448, to operate the steering system 1454 via one or more steering actuators 1456, to operate the propulsion system 1450 via one or more throttle/accelerators 1452. The controller(s) 1436 may include one or more onboard (e.g., integrated) computing devices (e.g., supercomputers) that process sensor signals, and output operation commands (e.g., signals representing commands) to enable autonomous driving and/or to assist a human driver in driving the vehicle 1400. The controller(s) 1436 may include a first controller 1436 for autonomous driving functions, a second controller 1436 for functional safety functions, a third controller 1436 for artificial intelligence functionality (e.g., computer vision), a fourth controller 1436 for infotainment functionality, a fifth controller 1436 for redundancy in emergency conditions, and/or other controllers. In some examples, a single controller 1436 may handle two or more of the above functionalities, two or more controllers 1436 may handle a single functionality, and/or any combination thereof.

The controller(s) 1436 may provide the signals for controlling one or more components and/or systems of the vehicle 1400 in response to sensor data received from one or more sensors (e.g., sensor inputs). The sensor data may be received from, for example and without limitation, global navigation satellite systems sensor(s) 1458 (e.g., Global Positioning System sensor(s)), RADAR sensor(s) 1460, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 1400), vibration sensor(s) 1442, steering sensor(s) 1440, brake sensor(s) (e.g., as part of the brake sensor system 1446), and/or other sensor types.

One or more of the controller(s) 1436 may receive inputs (e.g., represented by input data) from an instrument cluster 1432 of the vehicle 1400 and provide outputs (e.g., represented by output data, display data, etc.) via a human-machine interface (HMI) display 1434, an audible annunciator, a loudspeaker, and/or via other components of the vehicle 1400. The outputs may include information such as vehicle velocity, speed, time, map data (e.g., the HD map 1422 of FIG. 14C), location data (e.g., the vehicle's 1400 location, such as on a map), direction, location of other vehicles (e.g., an occupancy grid), information about objects and status of objects as perceived by the controller(s) 1436, etc. For example, the HMI display 1434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1400 further includes a network interface 1424 which may use one or more wireless antenna(s) 1426 and/or modem(s) to communicate over one or more networks. For example, the network interface 1424 may be capable of communication over LTE, WCDMA, UMTS, GSM, CDMA2000, etc. The wireless antenna(s) 1426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 14B:
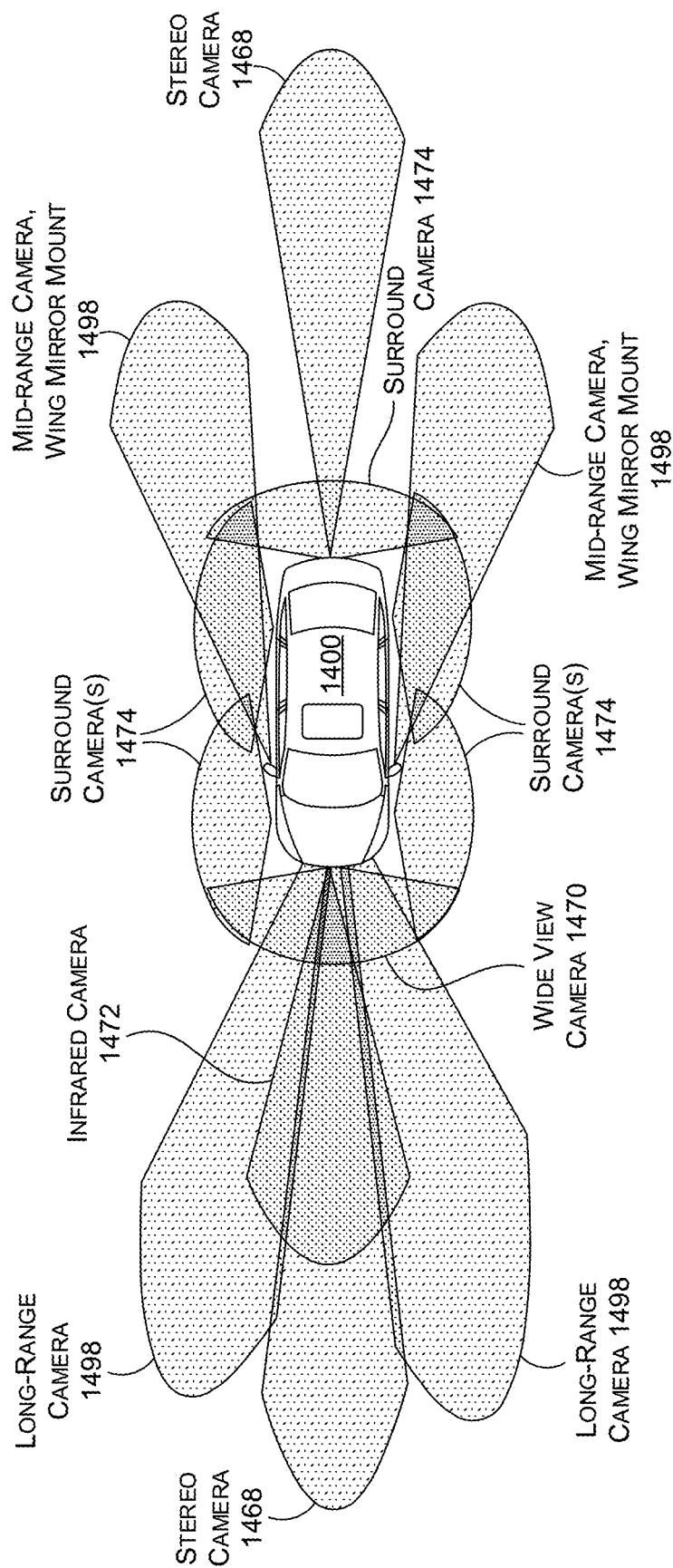
FIG. 14B is an example of camera locations and fields of view for the example autonomous vehicle of FIG. 14A, in accordance with some embodiments of the present disclosure.

FIG. 14B is an example of camera locations and fields of view for the example autonomous vehicle 1400 of FIG. 14A, in accordance with some embodiments of the present disclosure. The cameras and respective fields of view are one example embodiment and are not intended to be limiting. For example, additional and/or alternative cameras may be included and/or the cameras may be located at different locations on the vehicle 1400.

The camera types for the cameras may include, but are not limited to, digital cameras that may be adapted for use with the components and/or systems of the vehicle 1400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1400 (e.g., front-facing cameras) may be used for surround view, to help identify forward facing paths and obstacles, as well aid in, with the help of one or more controllers 1436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1470 that may be used to perceive objects coming into view from the periphery (e.g., pedestrians, crossing traffic or bicycles). Although only one wide-view camera is illustrated in FIG. 14B, there may any number of wide-view cameras 1470 on the vehicle 1400. In addition, long-range camera(s) 1498 (e.g., a long-view stereo camera pair) may be used for depth-based object detection, especially for objects for which a neural network has not yet been trained. The long-range camera(s) 1498 may also be used for object detection and classification, as well as basic object tracking.

One or more stereo cameras 1468 may also be included in a front-facing configuration. The stereo camera(s) 1468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1468 may be used in addition to, or alternatively from, those described herein.

Cameras with a field of view that include portions of the environment to the side of the vehicle 1400 (e.g., side-view cameras) may be used for surround view, providing information used to create and update the occupancy grid, as well as to generate side impact collision warnings. For example, surround camera(s) 1474 (e.g., four surround cameras 1474 as illustrated in FIG. 14B) may be positioned to on the vehicle 1400. The surround camera(s) 1474 may include wide-view camera(s) 1470, fisheye camera(s), 360 degree camera(s), and/or the like. Four example, four fisheye cameras may be positioned on the vehicle's front, rear, and sides. In an alternative arrangement, the vehicle may use three surround camera(s) 1474 (e.g., left, right, and rear), and may leverage one or more other camera(s) (e.g., a forward-facing camera) as a fourth surround view camera.

Cameras with a field of view that include portions of the environment to the rear of the vehicle 1400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1498, stereo camera(s) 1468), infrared camera(s) 1472, etc.), as described herein.

Figure 14C:
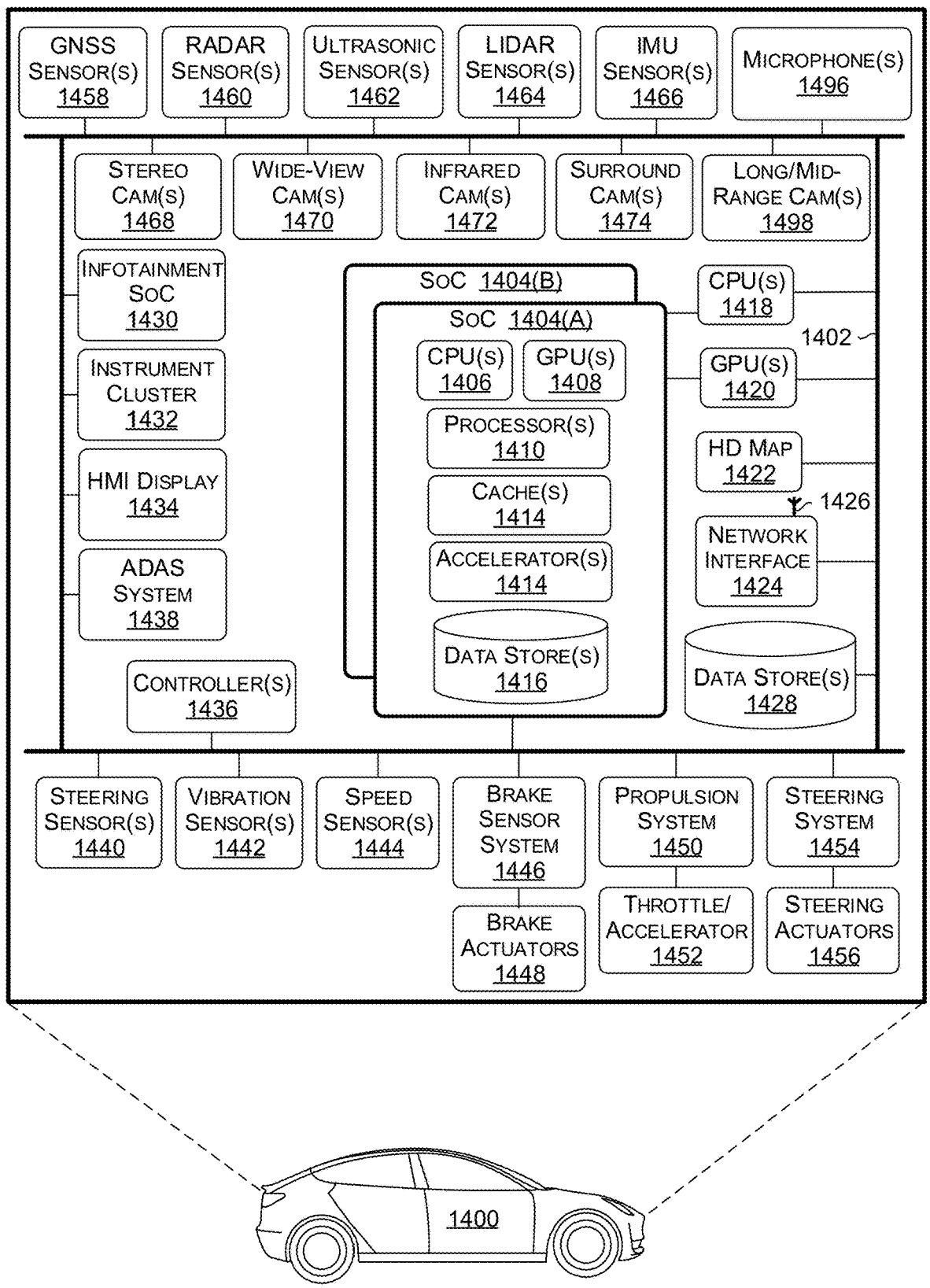
FIG. 14C is a block diagram of an example system architecture for the example autonomous vehicle of FIG. 14A, in accordance with some embodiments of the present disclosure.

FIG. 14C is a block diagram of an example system architecture for the example autonomous vehicle 1400 of FIG. 14A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1400 in FIG. 14C are illustrated as being connected via bus 1402. The bus 1402 may include a Controller Area Network (CAN) data interface (alternatively referred to herein as a "CAN bus"). A CAN may be a network inside the vehicle 1400 used to aid in control of various features and functionality of the vehicle 1400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1402 is described herein as being a CAN bus, this is not intended to be limiting. For example, in addition to, or alternatively from, the CAN bus, FlexRay and/or Ethernet may be used. Additionally, although a single line is used to represent the bus 1402, this is not intended to be limiting. For example, there may be any number of busses 1402, which may include one or more CAN busses, one or more FlexRay busses, one or more Ethernet busses, and/or one or more other types of busses using a different protocol. In some examples, two or more busses 1402 may be used to perform different functions, and/or may be used for redundancy. For example, a first bus 1402 may be used for collision avoidance functionality and a second bus 1402 may be used for actuation control. In any example, each bus 1402 may communicate with any of the components of the vehicle 1400, and two or more busses 1402 may communicate with the same components. In some examples, each SoC 1404, each controller 1436, and/or each computer within the vehicle may have access to the same input data (e.g., inputs from sensors of the vehicle 1400), and may be connected to a common bus, such the CAN bus.

The vehicle 1400 may include one or more controller(s) 1436, such as those described herein with respect to FIG. 14A. The controller(s) 1436 may be used for a variety of functions. The controller(s) 1436 may be coupled to any of the various other components and systems of the vehicle 1400, and may be used for control of the vehicle 1400, artificial intelligence of the vehicle 1400, infotainment for the vehicle 1400, and/or the like.

The vehicle 1400 may include a system(s) on a chip (SoC) 1404. The SoC 1404 may include CPU(s) 1406, GPU(s) 1408, processor(s) 1410, cache(s) 1412, accelerator(s) 1414, data store(s) 1416, and/or other components and features not illustrated. The SoC(s) 1404 may be used to control the vehicle 1400 in a variety of platforms and systems. For example, the SoC(s) 1404 may be combined in a system (e.g., the system of the vehicle 1400) with an HD map 1422 which may obtain map refreshes and/or updates via a network interface 1424 from one or more servers (e.g., server(s) 1478 of FIG. 14D).

The CPU(s) 1406 may include a CPU cluster or CPU complex (alternatively referred to herein as a "CCPLEX"). The CPU(s) 1406 may include multiple cores and/or L2 caches. For example, in some embodiments, the CPU(s) 1406 may include eight cores in a coherent multi-processor configuration. In some embodiments, the CPU(s) 1406 may include four dual-core clusters where each cluster has a dedicated L2 cache (e.g., a 2 MB L2 cache). The CPU(s) 1406 (e.g., the CCPLEX) may be configured to support simultaneous cluster operation enabling any combination of the clusters of the CPU(s) 1406 to be active at any given time.

The CPU(s) 1406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1408 may include an integrated GPU (alternatively referred to herein as an "iGPU"). The GPU(s) 1408 may be programmable and may be efficient for parallel workloads. The GPU(s) 1408, in some examples, may use an enhanced tensor instruction set. The GPU(s) 1408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1408 may include at least eight streaming microprocessors. The GPU(s) 1408 may use compute application programming interface(s) (API(s)). In addition, the GPU(s) 1408 may use one or more parallel computing platforms and/or programming models (e.g., NVIDIA's CUDA).

The GPU(s) 1408 may be power-optimized for best performance in automotive and embedded use cases. For example, the GPU(s) 1408 may be fabricated on a Fin field-effect transistor (FinFET). However, this is not intended to be limiting and the GPU(s) 1408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1408 to access the CPU(s) 1406 page tables directly. In such examples, when the GPU(s) 1408 memory management unit (MMU) experiences a miss, an address translation request may be transmitted to the CPU(s) 1406. In response, the CPU(s) 1406 may look in its page tables for the virtual-to-physical mapping for the address and transmits the translation back to the GPU(s) 1408. As such, unified memory technology may allow a single unified virtual address space for memory of both the CPU(s) 1406 and the GPU(s) 1408, thereby simplifying the GPU(s) 1408 programming and porting of applications to the GPU(s) 1408.

In addition, the GPU(s) 1408 may include an access counter that may keep track of the frequency of access of the GPU(s) 1408 to memory of other processors. The access counter may help ensure that memory pages are moved to the physical memory of the processor that is accessing the pages most frequently.

The SoC(s) 1404 may include any number of cache(s) 1412, including those described herein. For example, the cache(s) 1412 may include an L3 cache that is available to both the CPU(s) 1406 and the GPU(s) 1408 (e.g., that is connected both the CPU(s) 1406 and the GPU(s) 1408). The cache(s) 1412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1404 may include an arithmetic logic unit(s) (ALU(s)) which may be leveraged in performing processing with respect to any of the variety of tasks or operations of the vehicle 1400—such as processing DNNs. In addition, the SoC(s) 1404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1406 and/or GPU(s) 1408.

The SoC(s) 1404 may include one or more accelerators 1414 (e.g., hardware accelerators, software accelerators, or a combination thereof). For example, the SoC(s) 1404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1408 and to off-load some of the tasks of the GPU(s) 1408 (e.g., to free up more cycles of the GPU(s) 1408 for performing other tasks). As an example, the accelerator(s) 1414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1408, and by using an inference accelerator, for example, a designer may target either the DLA(s) or the GPU(s) 1408 for any function. For example, the designer may focus processing of CNNs and floating point operations on the DLA(s) and leave other functions to the GPU(s) 1408 and/or other accelerator(s) 1414.

The accelerator(s) 1414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1414 (e.g., the hardware acceleration cluster) may include a computer vision network on-chip and SRAM, for providing a high-bandwidth, low latency SRAM for the accelerator(s) 1414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1466 output that correlates with the vehicle 1400 orientation, distance, 3D location estimates of the object obtained from the neural network and/or other sensors (e.g., LIDAR sensor(s) 1464 or RADAR sensor(s) 1460), among others.

The SoC(s) 1404 may include data store(s) 1416 (e.g., memory). The data store(s) 1416 may be on-chip memory of the SoC(s) 1404, which may store neural networks to be executed on the GPU and/or the DLA. In some examples, the data store(s) 1416 may be large enough in capacity to store multiple instances of neural networks for redundancy and safety. The data store(s) 1412 may comprise L2 or L3 cache(s) 1412. Reference to the data store(s) 1416 may include reference to the memory associated with the PVA, DLA, and/or other accelerator(s) 1414, as described herein.

The SoC(s) 1404 may include one or more processor(s) 1410 (e.g., embedded processors). The processor(s) 1410 may include a boot and power management processor that may be a dedicated processor and subsystem to handle boot power and management functions and related security enforcement. The boot and power management processor may be a part of the SoC(s) 1404 boot sequence and may provide runtime power management services. The boot power and management processor may provide clock and voltage programming, assistance in system low power state transitions, management of SoC(s) 1404 thermals and temperature sensors, and/or management of the SoC(s) 1404 power states. Each temperature sensor may be implemented as a ring-oscillator whose output frequency is proportional to temperature, and the SoC(s) 1404 may use the ring-oscillators to detect temperatures of the CPU(s) 1406, GPU(s) 1408, and/or accelerator(s) 1414. If temperatures are determined to exceed a threshold, the boot and power management processor may enter a temperature fault routine and put the SoC(s) 1404 into a lower power state and/or put the vehicle 1400 into a chauffeur to safe stop mode (e.g., bring the vehicle 1400 to a safe stop).

The processor(s) 1410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1410 may further include a real-time camera engine that may include a dedicated processor subsystem for handling real-time camera management.

The processor(s) 1410 may further include a high-dynamic range signal processor that may include an image signal processor that is a hardware engine that is part of the camera processing pipeline.

The processor(s) 1410 may include a video image compositor that may be a processing block (e.g., implemented on a microprocessor) that implements video post-processing functions needed by a video playback application to produce the final image for the player window. The video image compositor may perform lens distortion correction on wide-view camera(s) 1470, surround camera(s) 1474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1408 is not required to continuously render new surfaces. Even when the GPU(s) 1408 is powered on and active doing 3D rendering, the video image compositor may be used to offload the GPU(s) 1408 to improve performance and responsiveness.

The SoC(s) 1404 may further include a mobile industry processor interface (MIPI) camera serial interface for receiving video and input from cameras, a high-speed interface, and/or a video input block that may be used for camera and related pixel input functions. The SoC(s) 1404 may further include an input/output controller(s) that may be controlled by software and may be used for receiving I/O signals that are uncommitted to a specific role.

The SoC(s) 1404 may further include a broad range of peripheral interfaces to enable communication with peripherals, audio codecs, power management, and/or other devices. The SoC(s) 1404 may be used to process data from cameras (e.g., connected over Gigabit Multimedia Serial Link and Ethernet), sensors (e.g., LIDAR sensor(s) 1464, RADAR sensor(s) 1460, etc. that may be connected over Ethernet), data from bus 1402 (e.g., speed of vehicle 1400, steering wheel position, etc.), data from GNSS sensor(s) 1458 (e.g., connected over Ethernet or CAN bus). The SoC(s) 1404 may further include dedicated high-performance mass storage controllers that may include their own DMA engines, and that may be used to free the CPU(s) 1406 from routine data management tasks.

The SoC(s) 1404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1404 may be faster, more reliable, and even more energy-efficient and space-efficient than conventional systems. For example, the accelerator(s) 1414, when combined with the CPU(s) 1406, the GPU(s) 1408, and the data store(s) 1416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1408.

In some examples, a CNN for facial recognition and vehicle owner identification may use data from camera sensors to identify the presence of an authorized driver and/or owner of the vehicle 1400. The always on sensor processing engine may be used to unlock the vehicle when the owner approaches the driver door and turn on the lights, and, in security mode, to disable the vehicle when the owner leaves the vehicle. In this way, the SoC(s) 1404 provide for security against theft and/or carjacking.

In another example, a CNN for emergency vehicle detection and identification may use data from microphones 1496 to detect and identify emergency vehicle sirens. In contrast to conventional systems, that use general classifiers to detect sirens and manually extract features, the SoC(s) 1404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1462, until the emergency vehicle(s) passes.

The vehicle may include a CPU(s) 1418 (e.g., discrete CPU(s), or dCPU(s)), that may be coupled to the SoC(s) 1404 via a high-speed interconnect (e.g., PCIe). The CPU(s) 1418 may include an X86 processor, for example. The CPU(s) 1418 may be used to perform any of a variety of functions, including arbitrating potentially inconsistent results between ADAS sensors and the SoC(s) 1404, and/or monitoring the status and health of the controller(s) 1436 and/or infotainment SoC 1430, for example.

The vehicle 1400 may include a GPU(s) 1420 (e.g., discrete GPU(s), or dGPU(s)), that may be coupled to the SoC(s) 1404 via a high-speed interconnect (e.g., NVIDIA's NVLINK). The GPU(s) 1420 may provide additional artificial intelligence functionality, such as by executing redundant and/or different neural networks, and may be used to train and/or update neural networks based on input (e.g., sensor data) from sensors of the vehicle 1400.

The vehicle 1400 may further include the network interface 1424 which may include one or more wireless antennas 1426 (e.g., one or more wireless antennas for different communication protocols, such as a cellular antenna, a Bluetooth antenna, etc.). The network interface 1424 may be used to enable wireless connectivity over the Internet with the cloud (e.g., with the server(s) 1478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1400 information about vehicles in proximity to the vehicle 1400 (e.g., vehicles in front of, on the side of, and/or behind the vehicle 1400). This functionality may be part of a cooperative adaptive cruise control functionality of the vehicle 1400.

The network interface 1424 may include a SoC that provides modulation and demodulation functionality and enables the controller(s) 1436 to communicate over wireless networks. The network interface 1424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1400 may further include data store(s) 1428 which may include off-chip (e.g., off the SoC(s) 1404) storage. The data store(s) 1428 may include one or more storage elements including RAM, SRAM, DRAM, VRAM, Flash, hard disks, and/or other components and/or devices that may store at least one bit of data.

The vehicle 1400 may further include GNSS sensor(s) 1458. The GNSS sensor(s) 1458 (e.g., GPS, assisted GPS sensors, differential GPS (DGPS) sensors, etc.), to assist in mapping, perception, occupancy grid generation, and/or path planning functions. Any number of GNSS sensor(s) 1458 may be used, including, for example and without limitation, a GPS using a USB connector with an Ethernet to Serial (RS-232) bridge.

The vehicle 1400 may further include RADAR sensor(s) 1460. The RADAR sensor(s) 1460 may be used by the vehicle 1400 for long-range vehicle detection, even in darkness and/or severe weather conditions. RADAR functional safety levels may be ASIL B. The RADAR sensor(s) 1460 may use the CAN and/or the bus 1402 (e.g., to transmit data generated by the RADAR sensor(s) 1460) for control and to access object tracking data, with access to Ethernet to access raw data in some examples. A wide variety of RADAR sensor types may be used. For example, and without limitation, the RADAR sensor(s) 1460 may be suitable for front, rear, and side RADAR use. In some example, Pulse Doppler RADAR sensor(s) are used.

The RADAR sensor(s) 1460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1400 surroundings at higher speeds with minimal interference from traffic in adjacent lanes. The other two antennae may expand the field of view, making it possible to quickly detect vehicles entering or leaving the vehicle's 1400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1400 may further include ultrasonic sensor(s) 1462. The ultrasonic sensor(s) 1462, which may be positioned at the front, back, and/or the sides of the vehicle 1400, may be used for park assist and/or to create and update an occupancy grid. A wide variety of ultrasonic sensor(s) 1462 may be used, and different ultrasonic sensor(s) 1462 may be used for different ranges of detection (e.g., 2.5 m, 4 m). The ultrasonic sensor(s) 1462 may operate at functional safety levels of ASIL B.

The vehicle 1400 may include LIDAR sensor(s) 1464. The LIDAR sensor(s) 1464 may be used for object and pedestrian detection, emergency braking, collision avoidance, and/or other functions. The LIDAR sensor(s) 1464 may be functional safety level ASIL B. In some examples, the vehicle 1400 may include multiple LIDAR sensors 1464 (e.g., two, four, six, etc.) that may use Ethernet (e.g., to provide data to a Gigabit Ethernet switch).

In some examples, the LIDAR sensor(s) 1464 may be capable of providing a list of objects and their distances for a 360-degree field of view. Commercially available LIDAR sensor(s) 1464 may have an advertised range of approximately 1400 m, with an accuracy of 2 cm-3 cm, and with support for a 1400 Mbps Ethernet connection, for example. In some examples, one or more non-protruding LIDAR sensors 1464 may be used. In such examples, the LIDAR sensor(s) 1464 may be implemented as a small device that may be embedded into the front, rear, sides, and/or corners of the vehicle 1400. The LIDAR sensor(s) 1464, in such examples, may provide up to a 120-degree horizontal and 35-degree vertical field-of-view, with a 200 m range even for low-reflectivity objects. Front-mounted LIDAR sensor(s) 1464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1464 may be less susceptible to motion blur, vibration, and/or shock.

The vehicle may further include IMU sensor(s) 1466. The IMU sensor(s) 1466 may be located at a center of the rear axle of the vehicle 1400, in some examples. The IMU sensor(s) 1466 may include, for example and without limitation, an accelerometer(s), a magnetometer(s), a gyroscope(s), a magnetic compass(es), and/or other sensor types. In some examples, such as in six-axis applications, the IMU sensor(s) 1466 may include accelerometers and gyroscopes, while in nine-axis applications, the IMU sensor(s) 1466 may include accelerometers, gyroscopes, and magnetometers.

In some embodiments, the IMU sensor(s) 1466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1466 may enable the vehicle 1400 to estimate heading without requiring input from a magnetic sensor by directly observing and correlating the changes in velocity from GPS to the IMU sensor(s) 1466. In some examples, the IMU sensor(s) 1466 and the GNSS sensor(s) 1458 may be combined in a single integrated unit.

The vehicle may include microphone(s) 1496 placed in and/or around the vehicle 1400. The microphone(s) 1496 may be used for emergency vehicle detection and identification, among other things.

The vehicle may further include any number of camera types, including stereo camera(s) 1468, wide-view camera(s) 1470, infrared camera(s) 1472, surround camera(s) 1474, long-range and/or mid-range camera(s)

1498, and/or other camera types. The cameras may be used to capture image data around an entire periphery of the vehicle 1400. The types of cameras used depends on the embodiments and requirements for the vehicle 1400, and any combination of camera types may be used to provide the necessary coverage around the vehicle 1400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 14A and FIG. 14B.

The vehicle 1400 may further include vibration sensor(s) 1442. The vibration sensor(s) 1442 may measure vibrations of components of the vehicle, such as the axle(s). For example, changes in vibrations may indicate a change in road surfaces. In another example, when two or more vibration sensors 1442 are used, the differences between the vibrations may be used to determine friction or slippage of the road surface (e.g., when the difference in vibration is between a power-driven axle and a freely rotating axle).

The vehicle 1400 may include an ADAS system 1438. The ADAS system 1438 may include a SoC, in some examples. The ADAS system 1438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1460, LIDAR sensor(s) 1464, and/or a camera(s). The ACC systems may include longitudinal ACC and/or lateral ACC. Longitudinal ACC monitors and controls the distance to the vehicle immediately ahead of the vehicle 1400 and automatically adjust the vehicle speed to maintain a safe distance from vehicles ahead. Lateral ACC performs distance keeping, and advises the vehicle 1400 to change lanes when necessary. Lateral ACC is related to other ADAS applications such as LCA and CWS.

CACC uses information from other vehicles that may be received via the network interface 1424 and/or the wireless antenna(s) 1426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1400), while the I2V communication concept provides information about traffic further ahead. CACC systems may include either or both I2V and V2V information sources. Given the information of the vehicles ahead of the vehicle 1400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1400 if the vehicle 1400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1400 is backing up. Some RCTW systems include AEB to ensure that the vehicle brakes are applied to avoid a crash. RCTW systems may use one or more rear-facing RADAR sensor(s) 1460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1400, the vehicle 1400 itself must, in the case of conflicting results, decide whether to heed the result from a primary computer or a secondary computer (e.g., a first controller 1436 or a second controller 1436). For example, in some embodiments, the ADAS system 1438 may be a backup and/or secondary computer for providing perception information to a backup computer rationality module. The backup computer rationality monitor may run a redundant diverse software on hardware components to detect faults in perception and dynamic driving tasks. Outputs from the ADAS system 1438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1404.

In other examples, ADAS system 1438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1438 may be fed into the primary computer's perception block and/or the primary computer's dynamic driving task block. For example, if the ADAS system 1438 indicates a forward crash warning due to an object immediately ahead, the perception block may use this information when identifying objects. In other examples, the secondary computer may have its own neural network which is trained and thus reduces the risk of false positives, as described herein.

The vehicle 1400 may further include the infotainment SoC 1430 (e.g., an in-vehicle infotainment system (IVI)). Although illustrated and described as a SoC, the infotainment system may not be a SoC, and may include two or more discrete components. The infotainment SoC 1430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1400. For example, the infotainment SoC 1430 may radios, disk players, navigation systems, video players, USB and Bluetooth connectivity, carputers, in-car entertainment, Wi-Fi, steering wheel audio controls, hands free voice control, a heads-up display (HUD), an HMI display 1434, a telematics device, a control panel (e.g., for controlling and/or interacting with various components, features, and/or systems), and/or other components. The infotainment SoC 1430 may further be used to provide information (e.g., visual and/or audible) to a user(s) of the vehicle, such as information from the ADAS system 1438, autonomous driving information such as planned vehicle maneuvers, trajectories, surrounding environment information (e.g., intersection information, vehicle information, road information, etc.), and/or other information.

The infotainment SoC 1430 may include GPU functionality. The infotainment SoC 1430 may communicate over the bus 1402 (e.g., CAN bus, Ethernet, etc.) with other devices, systems, and/or components of the vehicle 1400. In some examples, the infotainment SoC 1430 may be coupled to a supervisory MCU such that the GPU of the infotainment system may perform some self-driving functions in the event that the primary controller(s) 1436 (e.g., the primary and/or backup computers of the vehicle 1400) fail. In such an example, the infotainment SoC 1430 may put the vehicle 1400 into a chauffeur to safe stop mode, as described herein.

The vehicle 1400 may further include an instrument cluster 1432 (e.g., a digital dash, an electronic instrument cluster, a digital instrument panel, etc.). The instrument cluster 1432 may include a controller and/or supercomputer (e.g., a discrete controller or supercomputer). The instrument cluster 1432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1430 and the instrument cluster 1432. In other words, the instrument cluster 1432 may be included as part of the infotainment SoC 1430, or vice versa.

Figure 14D:
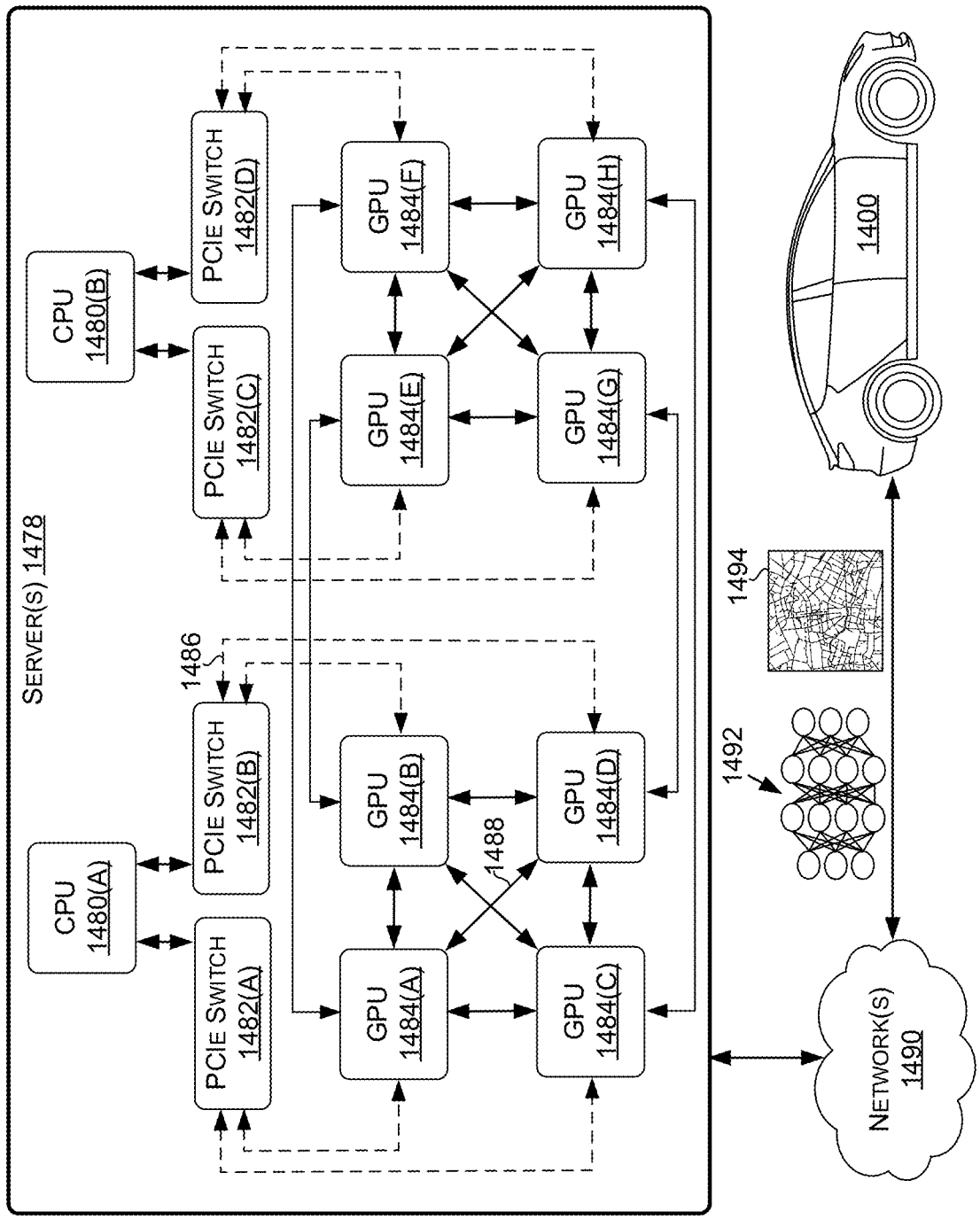
FIG. 14D is a system diagram for communication between cloud-based server(s) and the example autonomous vehicle of FIG. 14A, in accordance with some embodiments of the present disclosure.

FIG. 14D is a system diagram for communication between cloud-based server(s) and the example autonomous vehicle 1400 of FIG. 14A, in accordance with some embodiments of the present disclosure. The system 1476 may include server(s) 1478, network(s) 1490, and vehicles, including the vehicle 1400. The server(s) 1478 may include a plurality of GPUs 1484(A)-1484(H) (collectively referred to herein as GPUs 1484), PCIe switches 1482(A)-1482(H) (collectively referred to herein as PCIe switches 1482), and/or CPUs 1480(A)-1480(B) (collectively referred to herein as CPUs 1480). The GPUs 1484, the CPUs 1480, and the PCIe switches may be interconnected with high-speed interconnects such as, for example and without limitation, NVLink interfaces 1488 developed by NVIDIA and/or PCIe connections 1486. In some examples, the GPUs 1484 are connected via NVLink and/or NVSwitch SoC and the GPUs 1484 and the PCIe switches 1482 are connected via PCIe interconnects. Although eight GPUs 1484, two CPUs 1480, and two PCIe switches are illustrated, this is not intended to be limiting. Depending on the embodiment, each of the server(s) 1478 may include any number of GPUs 1484, CPUs 1480, and/or PCIe switches. For example, the server(s) 1478 may each include eight, sixteen, thirty-two, and/or more GPUs 1484.

The server(s) 1478 may receive, over the network(s) 1490 and from the vehicles, image data representative of images showing unexpected or changed road conditions, such as recently commenced road-work. The server(s) 1478 may transmit, over the network(s) 1490 and to the vehicles, neural networks 1492, updated neural networks 1492, and/or map information 1494, including information regarding traffic and road conditions. The updates to the map information 1494 may include updates for the HD map 1422, such as information regarding construction sites, potholes, detours, flooding, and/or other obstructions. In some examples, the neural networks 1492, the updated neural networks 1492, and/or the map information 1494 may have resulted from new training and/or experiences represented in data received from any number of vehicles in the environment, and/or based on training performed at a datacenter (e.g., using the server(s) 1478 and/or other servers).

The server(s) 1478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1490, and/or the machine learning models may be used by the server(s) 1478 to remotely monitor the vehicles.

In some examples, the server(s) 1478 may receive data from the vehicles and apply the data to up-to-date real-time neural networks for real-time intelligent inferencing. The server(s) 1478 may include deep-learning supercomputers and/or dedicated AI computers powered by GPU(s) 1484, such as a DGX and DGX Station machines developed by NVIDIA. However, in some examples, the server(s) 1478 may include deep learning infrastructure that use only CPU-powered datacenters.

The deep-learning infrastructure of the server(s) 1478 may be capable of fast, real-time inferencing, and may use that capability to evaluate and verify the health of the processors, software, and/or associated hardware in the vehicle 1400. For example, the deep-learning infrastructure may receive periodic updates from the vehicle 1400, such as a sequence of images and/or objects that the vehicle 1400 has located in that sequence of images (e.g., via computer vision and/or other machine learning object classification techniques). The deep-learning infrastructure may run its own neural network to identify the objects and compare them with the objects identified by the vehicle 1400 and, if the results do not match and the infrastructure concludes that the AI in the vehicle 1400 is malfunctioning, the server(s) 1478 may transmit a signal to the vehicle 1400 instructing a fail-safe computer of the vehicle 1400 to assume control, notify the passengers, and complete a safe parking maneuver.

For inferencing, the server(s) 1478 may include the GPU(s) 1484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 15:
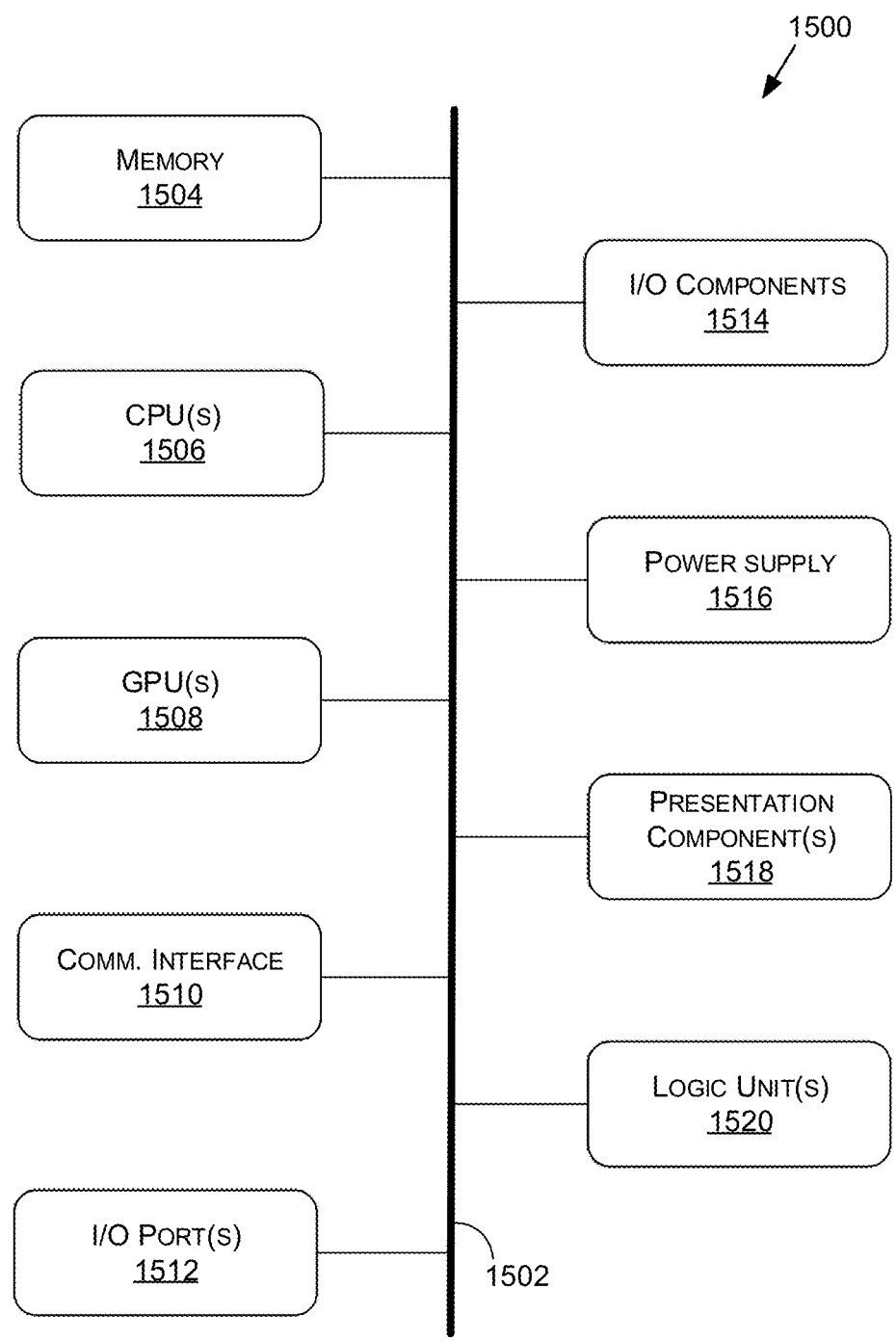
FIG. 15 is a block diagram of an example computing device suitable for use in implementing some embodiments of the present disclosure.

FIG. 15 is a block diagram of an example computing device(s) 1500 suitable for use in implementing some embodiments of the present disclosure. Computing device 1500 may include an interconnect system 1502 that directly or indirectly couples the following devices: memory 1504, one or more central processing units (CPUs) 1506, one or more graphics processing units (GPUs) 1508, a communication interface 1510, input/output (I/O) ports 1512, input/output components 1514, a power supply 1516, one or more presentation components 1518 (e.g., display(s)), and one or more logic units 1520. In at least one embodiment, the computing device(s) 1500 may comprise one or more virtual machines (VMs), and/or any of the components thereof may comprise virtual components (e.g., virtual hardware components). For non-limiting examples, one or more of the GPUs 1508 may comprise one or more vGPUs, one or more of the CPUs 1506 may comprise one or more vCPUs, and/or one or more of the logic units 1520 may comprise one or more virtual logic units. As such, a computing device(s) 1500 may include discrete components (e.g., a full GPU dedicated to the computing device 1500), virtual components (e.g., a portion of a GPU dedicated to the computing device 1500), or a combination thereof.

Although the various blocks of FIG. 15 are shown as connected via the interconnect system 1502 with lines, this is not intended to be limiting and is for clarity only. For example, in some embodiments, a presentation component 1518, such as a display device, may be considered an I/O component 1514 (e.g., if the display is a touch screen). As another example, the CPUs 1506 and/or GPUs 1508 may include memory (e.g., the memory 1504 may be representative of a storage device in addition to the memory of the GPUs 1508, the CPUs 1506, and/or other components). In other words, the computing device of FIG. 15 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 15.

The interconnect system 1502 may represent one or more links or busses, such as an address bus, a data bus, a control bus, or a combination thereof. The interconnect system 1502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1506 may be directly connected to the memory 1504. Further, the CPU 1506 may be directly connected to the GPU 1508. Where there is direct, or point-to-point connection between components, the interconnect system 1502 may include a PCIe link to carry out the connection. In these examples, a PCI bus need not be included in the computing device 1500.

The memory 1504 may include any of a variety of computer-readable media. The computer-readable media may be any available media that may be accessed by the computing device 1500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1506 may be configured to execute at least some of the computer-readable instructions to control one or more components of the computing device 1500 to perform one or more of the methods and/or processes described herein. The CPU(s) 1506 may each include one or more cores (e.g., one, two, four, eight, twenty-eight, seventy-two, etc.) that are capable of handling a multitude of software threads simultaneously. The CPU(s) 1506 may include any type of processor, and may include different types of processors depending on the type of computing device 1500 implemented (e.g., processors with fewer cores for mobile devices and processors with more cores for servers). For example, depending on the type of computing device 1500, the processor may be an Advanced RISC Machines (ARM) processor implemented using Reduced Instruction Set Computing (RISC) or an x86 processor implemented using Complex Instruction Set Computing (CISC). The computing device 1500 may include one or more CPUs 1506 in addition to one or more microprocessors or supplementary co-processors, such as math co-processors.

In addition to or alternatively from the CPU(s) 1506, the GPU(s) 1508 may be configured to execute at least some of the computer-readable instructions to control one or more components of the computing device 1500 to perform one or more of the methods and/or processes described herein. One or more of the GPU(s) 1508 may be an integrated GPU (e.g., with one or more of the CPU(s) 1506 and/or one or more of the GPU(s) 1508 may be a discrete GPU. In embodiments, one or more of the GPU(s) 1508 may be a coprocessor of one or more of the CPU(s) 1506. The GPU(s) 1508 may be used by the computing device 1500 to render graphics (e.g., 3D graphics) or perform general purpose computations. For example, the GPU(s) 1508 may be used for General-Purpose computing on GPUs (GPGPU). The GPU(s) 1508 may include hundreds or thousands of cores that are capable of handling hundreds or thousands of software threads simultaneously. The GPU(s) 1508 may generate pixel data for output images in response to rendering commands (e.g., rendering commands from the CPU(s) 1506 received via a host interface). The GPU(s) 1508 may include graphics memory, such as display memory, for storing pixel data or any other suitable data, such as GPGPU data. The display memory may be included as part of the memory 1504. The GPU(s) 1508 may include two or more GPUs operating in parallel (e.g., via a link). The link may directly connect the GPUs (e.g., using NVLINK) or may connect the GPUs through a switch (e.g., using NVSwitch). When combined together, each GPU 1508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1506 and/or the GPU(s) 1508, the logic unit(s) 1520 may be configured to execute at least some of the computer-readable instructions to control one or more components of the computing device 1500 to perform one or more of the methods and/or processes described herein. In embodiments, the CPU(s) 1506, the GPU(s) 1508, and/or the logic unit(s) 1520 may discretely or jointly perform any combination of the methods, processes and/or portions thereof. One or more of the logic units 1520 may be part of and/or integrated in one or more of the CPU(s) 1506 and/or the GPU(s) 1508 and/or one or more of the logic units 1520 may be discrete components or otherwise external to the CPU(s) 1506 and/or the GPU(s) 1508. In embodiments, one or more of the logic units 1520 may be a coprocessor of one or more of the CPU(s) 1506 and/or one or more of the GPU(s) 1508.

Examples of the logic unit(s) 1520 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1510 may include one or more receivers, transmitters, and/or transceivers that enable the computing device 1500 to communicate with other computing devices via an electronic communication network, included wired and/or wireless communications. The communication interface 1510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1512 may enable the computing device 1500 to be logically coupled to other devices including the I/O components 1514, the presentation component(s) 1518, and/or other components, some of which may be built in to (e.g., integrated in) the computing device 1500. Illustrative I/O components 1514 include a microphone, mouse, keyboard, joystick, game pad, game controller, satellite dish, scanner, printer, wireless device, etc. The I/O components 1514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1500. The computing device 1500 may be include depth cameras, such as stereoscopic camera systems, infrared camera systems, RGB camera systems, touchscreen technology, and combinations of these, for gesture detection and recognition. Additionally, the computing device 1500 may include accelerometers or gyroscopes (e.g., as part of an inertia measurement unit (IMU)) that enable detection of motion. In some examples, the output of the accelerometers or gyroscopes may be used by the computing device 1500 to render immersive augmented reality or virtual reality.

The power supply 1516 may include a hard-wired power supply, a battery power supply, or a combination thereof. The power supply 1516 may provide power to the computing device 1500 to enable the components of the computing device 1500 to operate.

The presentation component(s) 1518 may include a display (e.g., a monitor, a touch screen, a television screen, a heads-up-display (HUD), other display types, or a combination thereof), speakers, and/or other presentation components. The presentation component(s) 1518 may receive data from other components (e.g., the GPU(s) 1508, the CPU(s) 1506, etc.), and output the data (e.g., as an image, video, sound, etc.).

Example Data Center

Figure 16:
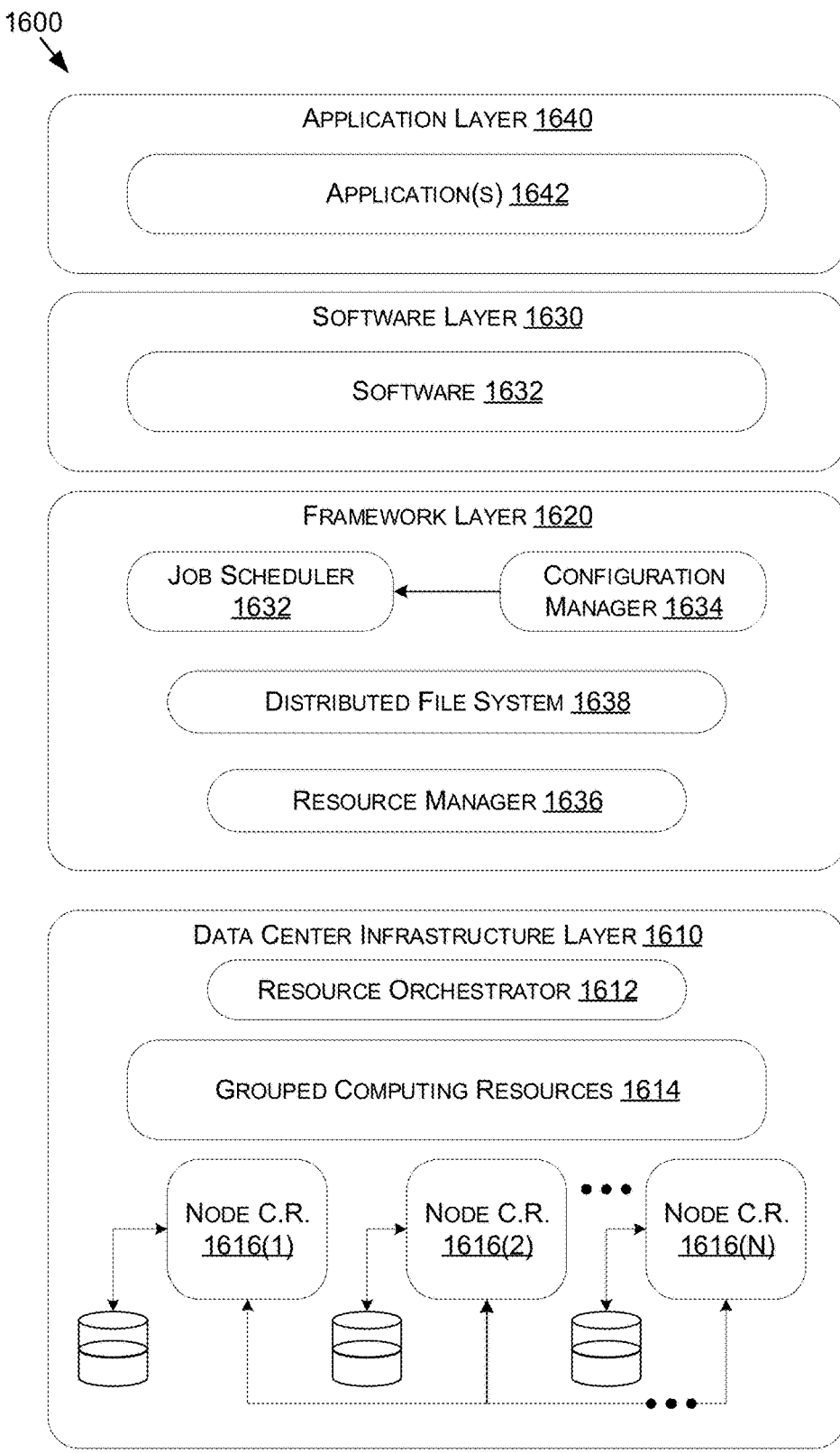
FIG. 16 is a block diagram of an example data center suitable for use in implementing some embodiments of the present disclosure.

FIG. 16 illustrates an example data center 1600 that may be used in at least one embodiments of the present disclosure. The data center 1600 may include a data center infrastructure layer 1610, a framework layer 1620, a software layer 1630, and/or an application layer 1640.

As shown in FIG. 16, the data center infrastructure layer 1610 may include a resource orchestrator 1612, grouped computing resources 1614, and node computing resources ("node C.R.s") 1616(1)-1616(N), where "N" represents any whole, positive integer. In at least one embodiment, node C.R.s 1616(1)-1616(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1616(1)-1616(N) may correspond to a server having one or more of the above-mentioned computing resources. In addition, in some embodiments, the node C.R.s 1616(1)-16161(N) may include one or more virtual components, such as vGPUs, vCPUs, and/or the like, and/or one or more of the node C.R.s 1616(1)-1616(N) may correspond to a virtual machine (VM).

In at least one embodiment, grouped computing resources 1614 may include separate groupings of node C.R.s 1616 housed within one or more racks (not shown), or many racks housed in data centers at various geographical locations (also not shown). Separate groupings of node C.R.s 1616 within grouped computing resources 1614 may include grouped compute, network, memory or storage resources that may be configured or allocated to support one or more workloads. In at least one embodiment, several node C.R.s 1616 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1622 may configure or otherwise control one or more node C.R.s 1616(1)-1616(N) and/or grouped computing resources 1614. In at least one embodiment, resource orchestrator 1622 may include a software design infrastructure ("SDI") management entity for the data center 1600. The resource orchestrator 1622 may include hardware, software, or some combination thereof.

In at least one embodiment, as shown in FIG. 16, framework layer 1620 may include a job scheduler 1632, a configuration manager 1634, a resource manager 1636, and/or a distributed file system 1638. The framework layer 1620 may include a framework to support software 1632 of software layer 1630 and/or one or more application(s) 1642 of application layer 1640. The software 1632 or application(s) 1642 may respectively include web-based service software or applications, such as those provided by Amazon Web Services, Google Cloud and Microsoft Azure. The framework layer 1620 may be, but is not limited to, a type of free and open-source software web application framework such as Apache Spark™ (hereinafter "Spark") that may utilize distributed file system 1638 for large-scale data processing (e.g., "big data"). In at least one embodiment, job scheduler 1632 may include a Spark driver to facilitate scheduling of workloads supported by various layers of data center 1600. The configuration manager 1634 may be capable of configuring different layers such as software layer 1630 and framework layer 1620 including Spark and distributed file system 1638 for supporting large-scale data processing. The resource manager 1636 may be capable of managing clustered or grouped computing resources mapped to or allocated for support of distributed file system 1638 and job scheduler 1632. In at least one embodiment, clustered or grouped computing resources may include grouped computing resource 1614 at data center infrastructure layer 1610. The resource manager 1036 may coordinate with resource orchestrator 1612 to manage these mapped or allocated computing resources.

In at least one embodiment, software 1632 included in software layer 1630 may include software used by at least portions of node C.R.s 1616(1)-1616(N), grouped computing resources 1614, and/or distributed file system 1638 of framework layer 1620. One or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616(1)-1616(N), grouped computing resources 1614, and/or distributed file system 1638 of framework layer 1620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1634, resource manager 1636, and resource orchestrator 1612 may implement any number and type of self-modifying actions based on any amount and type of data acquired in any technically feasible fashion. Self-modifying actions may relieve a data center operator of data center 1600 from making possibly bad configuration decisions and possibly avoiding underutilized and/or poor performing portions of a data center.

The data center 1600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1600. In at least one embodiment, trained or deployed machine learning models corresponding to one or more neural networks may be used to infer or predict information using resources described above with respect to the data center 1600 by using weight parameters calculated through one or more training techniques, such as but not limited to those described herein.

In at least one embodiment, the data center 1600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1500 of FIG. 15—e.g., each device may include similar components, features, and/or functionality of the computing device(s) 1500. In addition, where backend devices (e.g., servers, NAS, etc.) are implemented, the backend devices may be included as part of a data center 1600, an example of which is described in more detail herein with respect to FIG. 16.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1500 described herein with respect to FIG. 15. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    accessing sensor data corresponding to two or more sensor modalities, the sensor data obtained using two or more sensors;
    generating, based at least on a representation of one or more temporal offsets aligning the sensor data corresponding to the two or more sensor modalities, a representation of a sequence of annotation scenes comprising corresponding frame of the sensor data from each of the two or more sensors;
    generating, using a labeling tool, a representation of a sequence of annotation tasks ordering annotation of at least a portion of the sensor data corresponding to the two or more sensor modalities with ground truth annotations based at least on sensor modality;
    accepting, using the labeling tool, input annotating one or more annotation scenes from the sequence of annotation scenes with a set of the ground truth annotations defined by at least one annotation task in the sequence of annotation tasks; and
    exporting a representation of the set of the ground truth annotations.

2. The method of claim 1, wherein the generating of the sequence of annotation scenes comprises identifying a frame of obtained image data that is temporally closest to an obtained LiDAR spin, and calculating a corresponding one of the one or more temporal offsets between a start angle of the obtained LiDAR spin and a viewing angle represented by the obtained image data.

3. The method of claim 1, wherein the two or more sensors comprise a LiDAR sensor and one or more cameras, and the sequence of annotation tasks comprises:
    a first annotation task comprising annotation of camera frames in the sequence of annotation scenes;
    a second annotation task comprising annotation, in two-dimensional space, of LiDAR frames in the sequence of annotation scenes; and
    a third annotation task comprising linking of annotations appearing in multiple annotation scenes in the sequence of annotation scenes.

4. The method of claim 3, wherein the sequence of annotation tasks further comprises:
    a fourth annotation task comprising annotation, in three-dimensional space, of the LiDAR frames in the sequence of annotation scenes; and
    a fifth annotation task comprising linking of annotations appearing in both a LiDAR frame and a camera frame in any individual annotation scene in the sequence of annotation scenes.

5. The method of claim 1, wherein the sequence of annotation tasks separate annotation of different types of objects or different levels of annotation detail into separate annotation tasks.

6. The method of claim 1, further comprising, using the labeling tool, initializing a set of annotations, for at least one individual annotation scene in the sequence of annotation scenes during at least one individual annotation task of the sequence of annotation tasks, with a preceding set of annotations of a preceding annotation scene in the sequence set of annotation scenes during the at least one individual annotation task.

7. The method of claim 1, wherein at least one of the annotation tasks restricts annotation to a designated sensor modality of the two or more sensor modalities.

8. The method of claim 1, wherein at least one individual annotation scene in the sequence of annotation scenes comprises a first frame of the sensor data from a first type of sensor and a second frame of the sensor data from a second type of sensor, the method further comprising, using the labeling tool:
    determining a portion of the first frame identified by an input probe;
    projecting coordinates of the portion of the first frame into coordinates of a corresponding portion of the second frame; and
    causing visualization of the corresponding portion of the second frame.

9. The method of claim 1, further comprising, using the labeling tool, walking through a per-object procedure during the at least one annotation task, the per-object procedure comprising, for at least one annotation of an annotation scene of the sequence of annotation scenes, the at least one annotation received during a prior annotation task of the sequence of annotation tasks:
    causing presentation of a zoomed-in view of the annotation in the annotation scene; and
    prompting for and accepting input adjusting or confirming the annotation.

10. The method of claim 1, further comprising, using the labeling tool:
iterating through the annotation scenes in one or more labeling interfaces of the labeling tool; and
prompting for and accepting input annotating the one or more annotation scenes with a corresponding set of the ground truth annotations defined by the at least one annotation task, while causing presentation of the corresponding frame of the sensor data from each of the two or more sensors.

11. One or more processors comprising one or more circuits to:
access sensor data obtained during a capture session, the sensor data including LiDAR frames from a LiDAR sensor and camera frames from at least one camera;
compose a sequence of annotation scenes, comprising at least one annotation scene that identifies at least one LiDAR frame of the LiDAR frames and at least one camera frame of the camera frames, based at least on a representation of at least one temporal offset between the at least one LiDAR frame and the at least one camera frame;
generate, using a labeling tool, a representation of a sequence of annotation tasks ordering annotation of at least a portion of the sequence of annotation scenes with ground truth annotations based at least on sensor modality;
accept, using the labeling tool, input annotating one or more of the annotation scenes in the sequence of annotation scenes with a set of the ground truth annotations defined by at least one annotation task in the sequence of annotation tasks; and
export a representation of the set of the ground truth annotations.

12. The one or more processors of claim 11, wherein the one or more circuits are further to generate the at least one annotation scene based at least on determining that the at least one camera frame is temporally closest to the at least one LiDAR frame, and calculating the at least one temporal offset between a start angle of at least one obtained LiDAR spin represented by the at least one LiDAR frame and a corresponding viewing angle represented by the at least one camera frame.

13. The one or more processors of claim 11, wherein the sequence of annotation tasks comprises:
a first annotation task comprising annotation of a set of the camera frames in the sequence of annotation scenes;
a second annotation task comprising annotation, in two-dimensional space, of a set of the LiDAR frames in the sequence of annotation scenes; and
a third annotation task comprising linking of annotations appearing in multiple annotation scenes in the sequence of annotation scenes.

14. The one or more processors of claim 11, wherein the one or more circuits are further to initialize a set of annotations, for at least one individual annotation scene in the sequence of annotation scenes during at least one individual annotation task of the sequence of annotation tasks, with a preceding set of annotations of a preceding annotation scene in the sequence of annotation scenes during the at least one individual annotation task.

15. The one or more processors of claim 11, wherein the one or more circuits are further to:
identify a correspondence between a portion of the at least one LiDAR frame and a portion of the at least one camera frame based at least on projecting information from coordinates of the at least one LiDAR frame into coordinates of the at least one camera frame; and
cause presentation of a visualization of the correspondence.

16. The one or more processors of claim 11, wherein the one or more circuits are further to:
determine a portion of the at least one LiDAR frame identified by an input probe;
project coordinates of the portion of the at least one LiDAR frame into coordinates of a corresponding portion of the at least one camera frame; and
cause visualization of the corresponding portion of the at least one camera frame.

17. The one or more processors of claim 11, wherein the one or more circuits are further to iterate through a per-object procedure during the at least one annotation task, the per-object procedure comprising, for at least one annotation of an annotation scene, the at least one annotation received during a prior annotation task of the sequence of annotation tasks:
causing presentation of a zoomed-in view of the at least one annotation in the annotation scene; and
prompting for and accepting input adjusting or confirming the at least one annotation.

18. A system comprising one or more processors to:
generate, using a labeling tool, a representation of a sequence of annotation tasks ordering annotation of at least a portion of a sequence of annotation scenes with ground truth annotations based at least on sensor modality, at least one annotation scene in the sequence of annotation scenes comprising aligned frames of sensor data corresponding to multiple sensor modalities;
iterate, using the labeling tool, through the sequence of annotation scenes in one or more labeling interfaces of the labeling tool;
accept, using the labeling tool, input annotating the at least one annotation scene with a set of the ground truth annotations defined by at least one annotation task of the sequence of annotation tasks, while causing presentation of a set of the aligned frames of sensor data corresponding to the multiple sensor modalities; and
export a representation of the set of the ground truth annotations.

19. The system of claim 18, wherein at least one annotation scene in the sequence of annotation scenes comprises a first frame of the sensor data from a first type of sensor and a second frame of the sensor data from a second type of sensor, wherein the one or more processors are further to use the labeling tool to:
identify a correspondence between a portion of the first frame and a portion of the second frame based at least on projecting information from coordinates of the portion of the first frame into coordinates of the portion of the second frame; and
cause presentation of a visualization of the correspondence.

20. The system of claim 18, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;

a system incorporating one or more virtual machines (VMs);
a system implemented at least partially in a data center; or
a system implemented at least partially using cloud computing resources.

* * * * *